United States Patent
Loehr et al.

(10) Patent No.: US 10,985,894 B2
(45) Date of Patent: Apr. 20, 2021

(54) ACTIVATING A BANDWIDTH PART

(71) Applicant: Lenovo (Singapore) Pte. Ltd., New Tech Park (SG)

(72) Inventors: Joachim Loehr, Wiesbaden (DE); Alexander Johann Maria Golitschek Edler von Elbwart, Darmstadt (DE); Prateek Basu Mallick, Dreieich (DE); Ravi Kuchibhotla, Clarendon Hills, IL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 23 days.

(21) Appl. No.: 16/276,506

(22) Filed: Feb. 14, 2019

(65) Prior Publication Data
US 2019/0253230 A1 Aug. 15, 2019

Related U.S. Application Data

(60) Provisional application No. 62/630,762, filed on Feb. 14, 2018.

(51) Int. Cl.
*H04L 5/00* (2006.01)
*H04L 1/16* (2006.01)
*H04W 80/02* (2009.01)
*H04W 72/04* (2009.01)

(52) U.S. Cl.
CPC .......... *H04L 5/0098* (2013.01); *H04L 1/1614* (2013.01); *H04W 72/042* (2013.01); *H04W 72/0453* (2013.01); *H04W 80/02* (2013.01)

(58) Field of Classification Search
CPC .. H04L 5/0098; H04L 1/1614; H04W 72/042; H04W 72/0453; H04W 80/02
See application file for complete search history.

(56) References Cited

U.S. PATENT DOCUMENTS

| | | | |
|---|---|---|---|
| 10,638,507 B2 * | 4/2020 | Aiba ................. | H04W 72/0413 |
| 2013/0107828 A1 * | 5/2013 | Dinan ............... | H04W 72/1226 370/329 |
| 2013/0176952 A1 * | 7/2013 | Shin .................... | H04W 72/042 370/329 |
| 2015/0327276 A1 * | 11/2015 | Rebeiz ............. | H04W 72/1289 370/329 |
| 2016/0037386 A1 * | 2/2016 | Pitchaiah ................ | H04W 4/08 709/226 |

(Continued)

OTHER PUBLICATIONS

Chen et al. U.S. Appl. No. 62/537,802, filed Jul. 27, 2017 (Year: 2017).*

(Continued)

*Primary Examiner* — Wutchung Chu
(74) *Attorney, Agent, or Firm* — Kunzler Bean & Adamson

(57) ABSTRACT

Apparatuses, methods, and systems are disclosed for activating a bandwidth part. One apparatus includes a transceiver that receives a control element from a base unit associated with an active serving cell. The first apparatus includes a processor that determines an 'activation/deactivation' status of a set of BWPs configured in the active serving cell using the control element. The processor selectively activates a first BWP from the set of BWPs in the active serving cell based on the determined activation/deactivation status.

21 Claims, 6 Drawing Sheets

(56) References Cited

U.S. PATENT DOCUMENTS

| | | | |
|---|---|---|---|
| 2016/0119930 A1* | 4/2016 | Yan | H04W 74/006 370/329 |
| 2016/0255528 A1* | 9/2016 | Yao | H04W 24/10 370/252 |
| 2017/0094585 A1* | 3/2017 | Byun | H04W 48/12 |
| 2018/0124687 A1* | 5/2018 | Park | H04W 48/12 |
| 2018/0206214 A1* | 7/2018 | Bendlin | H04W 72/042 |
| 2019/0036673 A1* | 1/2019 | Chen | H04L 5/001 |
| 2019/0044689 A1* | 2/2019 | Yiu | H04W 72/042 |
| 2019/0044811 A1* | 2/2019 | Miao | H04L 41/0896 |
| 2019/0103954 A1* | 4/2019 | Lee | H04W 72/042 |
| 2019/0104543 A1* | 4/2019 | Park | H04L 1/1671 |
| 2019/0124558 A1* | 4/2019 | Ang | H04W 72/042 |
| 2019/0132824 A1* | 5/2019 | Jeon | H04L 5/0092 |
| 2019/0141742 A1* | 5/2019 | Zhou | H04W 28/20 |
| 2019/0149213 A1* | 5/2019 | Zhou | H04W 72/042 370/329 |
| 2019/0149380 A1* | 5/2019 | Babaei | H04L 5/001 370/330 |
| 2019/0150172 A1* | 5/2019 | Ang | H04L 5/0053 370/329 |
| 2019/0215781 A1* | 7/2019 | Jeon | H04W 76/32 |
| 2019/0215888 A1* | 7/2019 | Cirik | H04B 17/17 |
| 2019/0215900 A1* | 7/2019 | Pan | H04W 76/38 |
| 2020/0037260 A1* | 1/2020 | Fu | H04W 52/325 |
| 2020/0404564 A1* | 12/2020 | Kim | H04W 36/08 |

OTHER PUBLICATIONS

Ang et al. U.S. Appl. No. 62/587,311, filed Nov. 16, 2017 (Year: 2017).*

Jeon et al. U.S. Appl. No. 62/577,995, filed Oct. 27, 2017 (Year: 2017).*

3GPP, "3rd Generation Partnership Project; Technical Specification Group Radio Access Network; NR; Multiplexing and channel coding (Release 15)", 3GPP TS 38.212 V1.2.1, Dec. 2017, pp. 1-82.

3GPP, "3rd Generation Partnership Project; Technical Specification Group Radio Access Network; NR; Physical layer procedures for control (Release 15)", 3GPP TS 38213 V1.0.1, Sep. 2017, pp. 1-26.

ETSI, "5G; Study on Scenarios and Requirements for Next Generation Access Technologies (3GPP TR 38.913 version 142.0 Release 14)", ETSI TR 138 913 V14.2.0, Technical Report, May 2107, pp. 1-40.

Huawei, Hisilicon, "Bandwidth part activation and adaptation", 3GPP TSG RAN WG1 Meeting #91 R1-1719828, Nov. 27-Dec. 1, 2017, pp. 1-6.

Potevio, "BWP switch on C-DRX", 3GPP TSG RAN WG2 Meeting #100 R2-1712969, Nov. 1-Dec. 2017, pp. 1-3.

PCT/IB2019/000157, "Notification of Transmittal of the International Search Report and the Written Opinion of the International Searching Authority, or the Declaration", PCT International Searching Authority, dated Jul. 23, 2019, pp. 1-11.

3GPP, "3rd Generation Partnership Project; Technical Specification Group Radio Access Network; NR; Medium Access Control (MAC) protocol specification (Release 15)", 3GPP TS 38.321 V1.2.0, Dec. 2017, pp. 1-55.

Qualcomm Incorporated, "Open Issues on CA", 3GPP TSG RAN WG1 #90bis R1-1718581, Oct. 9-13, 2017, pp. 1-10.

* cited by examiner

ACTIVATING A BANDWIDTH PART

CROSS-REFERENCE TO RELATED APPLICATIONS

This application claims priority to U.S. Provisional Patent Application No. 62/630,762 entitled "MANAGING OF BANDWIDTH PARTS IN A SERVING CELL" and filed on Feb. 14, 2018 for Joachim Loehr, Alexander Johann Maria Golitschek Edler von Elbwart, Prateek Basu Mallick, and Ravi Kuchibhotla, which is incorporated herein by reference.

FIELD

The subject matter disclosed herein relates generally to wireless communications and more particularly relates to the managing of bandwidth parts in a serving cell.

BACKGROUND

The following abbreviations are herewith defined, at least some of which are referred to within the following description: Third Generation Partnership Project ("3GPP"), Positive-Acknowledgment ("ACK"), Bandwidth Part ("BWP"), Binary Phase Shift Keying ("BPSK"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Licensed Assisted Access ("eLAA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Network Temporary Identifier ("RNTI"), Reference Signal ("RS"), Remaining Minimum System Information ("RMSI"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINK"), System Information Block ("SIB"), Synchronization Signal ("SS"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, such as 3GPP 5G New Radio ("NR"), different OFDM numerologies, i.e., sub-carrier spacing ("SCS"), CP length, may be supported in a single framework. Further, certain wireless communications networks support Bandwidth adaption, i.e., adapting the size of the bandwidth used for data transmission in a serving cell, by a base station, such as a gNB, configuring the UE with UL and DL Bandwidth Part(s) ("BWP").

BRIEF SUMMARY

Methods for activating a bandwidth part are disclosed. Apparatuses and systems also perform the functions of the methods. The methods may also be embodied in one or more computer program products comprising executable code.

In one embodiment, a first method for activating a bandwidth part includes a UE receiving a control element from a base unit associated with an active serving cell. The first method includes the UE determining an 'activation/deactivation' status of a set of BWPs configured in the active serving cell using the control element. The first method includes the UE selectively activating a first BWP from the set of BWPs in the active serving cell based on the determined activation/deactivation status.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
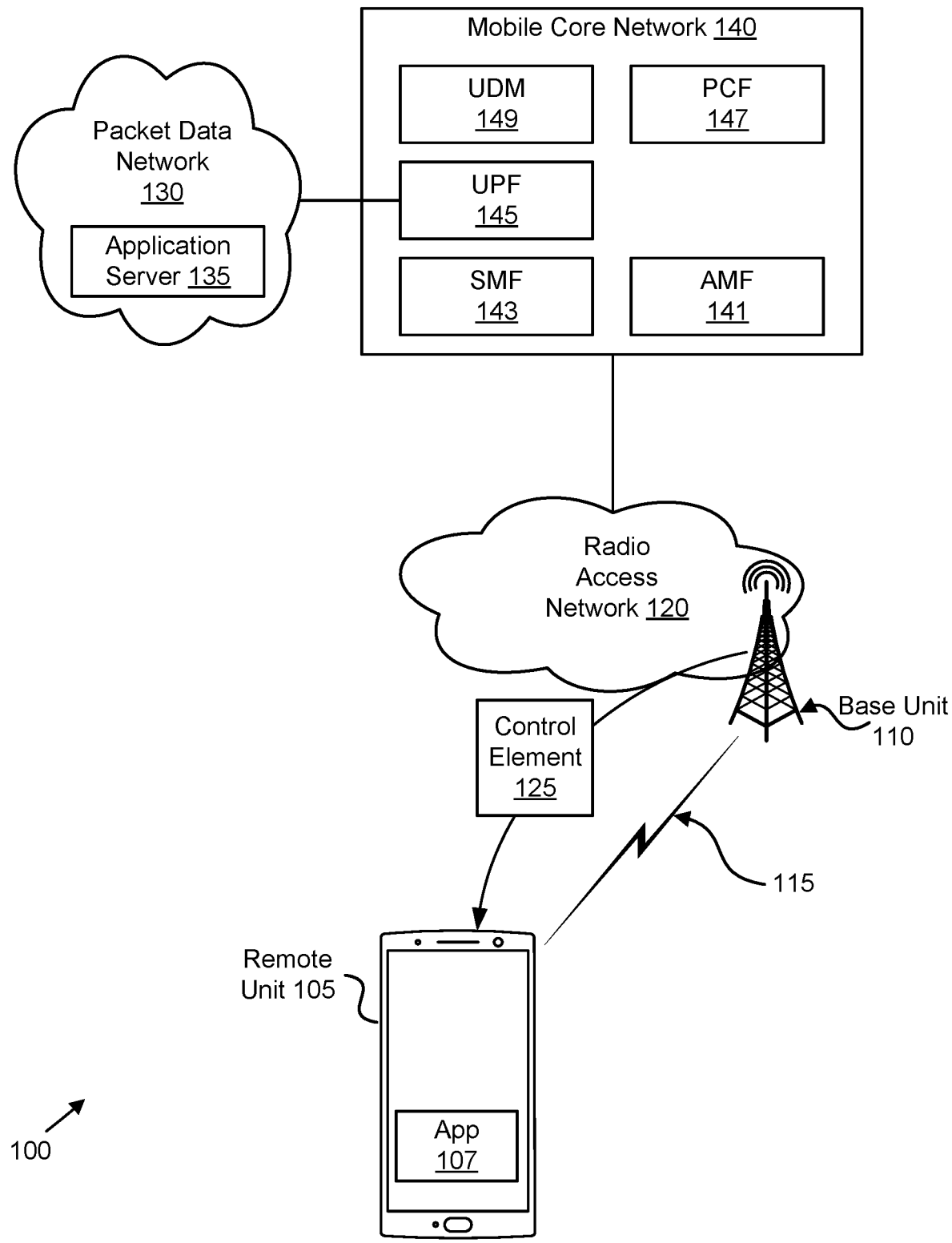
FIG. 1 is a schematic block diagram illustrating one embodiment of a wireless communication system for activating a bandwidth part.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for managing bandwidth parts in a serving cell, including procedures for bandwidth part activation, deactivation, and/or switching. In the following, the term "gNB" is generally used for a base station, but it is replaceable by any other radio access node, e.g., BS, eNB, gNB, AP, etc. Further the disclosed methods are described mainly in the context of NR. However, the disclosed procedures/methods are also equally applicable to other mobile communication systems, such as LTE and its variants, the IEEE 802.11 families, and the like.

5G/NR is to support different service types, at least including: enhanced mobile broadband ("eMBB"), ultra-reliable low-latency communications ("URLLC"), and massive machine type communication ("mMTC"). To support various requirements of the different services, NR is to support different OFDM numerologies (i.e., sub-carrier spacing ("SCS"), CP length) in a single framework. Various use cases/deployment scenarios for NR may have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in the case of URLLC, tighter requirements are put on ultra-low latency (0.5 ms for UL and DL each for user plane latency) and high reliability ($1-10^{-5}$ within 1 ms). Finally, mMTC requires high connection density, large coverage in harsh environments, and extremely long-life battery for low cost devices.

Accordingly, the OFDM numerology (e.g., subcarrier spacing, OFDM symbol duration, cyclic prefix ("CP") duration, number of symbols per scheduling interval) that is suitable for one use case might not work well for another. For example, low-latency services may require a shorter symbol duration (and thus larger subcarrier spacing) and/or fewer symbols per scheduling interval (aka, TTI) than an mMTC service. Furthermore, deployment scenarios with large channel delay spreads require a longer CP duration than scenarios with short delay spreads. The subcarrier spacing may be optimized accordingly to retain the similar CP overhead.

Different numerologies may be present across different carrier(s) for a given UE, as well as different numerologies within the same carrier for a given UE. Said differently, different OFDM numerologies may be multiplexed in frequency-domain and/or time-domain within the same carrier or across different carriers. Doing so benefits simultaneous support of services with vastly different requirements, e.g., simultaneous support of ultra-low latency communications (using short symbols and thus wide subcarrier spacing) and MBMS services (using long symbols to enable long cyclic prefix and thus narrow subcarrier spacing).

To enable Bandwidth adaption, i.e., adapting the size of the bandwidth used for data transmission in a serving cell, on the PCell, the gNB configures the UE with UL and DL Bandwidth Part(s) ("BWP"). To enable bandwidth adaptation on SCells for the case of carrier aggregation, the gNB configures the UE with DL BWP(s) at least (i.e., there may be none in the UL).

In paired spectrum, DL and UL can switch BWP independently. In unpaired spectrum, DL and UL switch BWP simultaneously. Switching between configured BWPs happens by means of a DCI, i.e., PDCCH indicating to switch to another Bandwidth part, or inactivity timer. When an inactivity timer is configured for a serving cell, the expiry of the inactivity timer associated to that cell switches the active BWP (e.g., active DL BWP) to a default BWP (e.g., default DL BWP) configured by the network.

A Serving Cell may be configured with at most four BWPs, and for an activated Serving Cell, there is always one active BWP at any point in time. The BWP switching for a Serving Cell is used to activate an inactive BWP and deactivate an active BWP at a time, and is controlled by the PDCCH indicating a downlink assignment or an uplink grant. Upon addition of SpCell or activation of an SCell, one BWP is initially active without receiving PDCCH indicating a downlink assignment or an uplink grant. Here, "SpCell" may refer either to a PCell of the main cell group ("MCG") or a PSCell of the secondary cell group ("SCG").

On the active BWP for each activated Serving Cell configured with a BWP, the MAC entity (e.g., a UE MAC layer entity) applies normal operations including: a) transmit on UL-SCH; b) transmit on RACH; c) monitor the PDCCH; d) transmit PUCCH; e) receive DL-SCH; and f) (re-)initialize any suspended configured uplink grants of configured grant Type 1 according to the stored configuration.

On the inactive BWP for each activated Serving Cell configured with a BWP, the MAC entity: a) is not to transmit on UL-SCH; b) is not to transmit on RACH; c) is not to monitor the PDCCH; d) is not to transmit PUCCH; e) is not to receive DL-SCH; f) is to clear any configured downlink assignment and configured uplink grant of configured grant Type 2; and g) is to suspend any configured uplink grant of configured Type 1.

If the active UL BWP has no PRACH resources configured, upon triggering of a RACH procedure, the UE is to switch to the initial DL BWP and UL BWP and perform RACH procedure. In one embodiment, if the UE MAC entity receives a PDCCH for BWP switching while a Random Access procedure is ongoing in the MAC entity, then it is up to UE implementation whether to switch BWP or ignore the PDCCH for BWP switching. If the MAC entity decides to perform BWP switching, then the MAC entity is to stop the ongoing Random Access procedure and initiate a Random Access procedure on the new activated BWP. However, if the MAC entity decides to ignore the PDCCH for BWP switching, then the MAC entity is to continue with the ongoing Random Access procedure on the active BWP.

As mentioned above, the current standard (Rel-15) allows only one active BWP at a time. Each BWP has an associated numerology, i.e., each BWP supports only one numerology. For cases when the UE supports services requiring different numerologies, the gNB needs to switch between different configured BWP(s). In order to support QoS more efficiently, in particular for scenarios where a UE has services/radio bearer running requiring different numerologies, the system may support multiple BWP(s) activated simultaneously.

Because the current DCI formats defined in TS 38.212 support only the switching of BWP(s), i.e., jointly deactivating a current activated BWP and activating a previously deactivated BWP, new procedures and related signaling offering an efficient management of the configured BWP(s) in serving cell are disclosed herein. For example, a procedure for the activation of a deactivated BWP without simultaneously deactivating another—currently activated—BWP is disclosed. The present disclosure outlines several methods/procedures for managing bandwidth parts in a serving cell, including efficient activation/deactivation/switching of UL/DL BWP(s).

FIG. 1 depicts a wireless communication system 100 for activating a bandwidth part, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 140 are depicted in FIG. 1, one of skill in the art will recognize that any number of remote units 105, base units 110, wireless communication links 115, RANs 120, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140.

In some embodiments, the remote units 105 communicate with an application server 135 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 via the RAN 120. The mobile core network 140 then relays traffic between the remote unit 105 and the application server 135 in the packet data network 130 using the PDU session. Note that the remote unit 105 may establish one or more PDU sessions (or other data connections) with the mobile core network 140. As such, the remote unit 105 may concurrently have at least one PDU session for communicating with the packet data network 130 and at least one PDU session for communicating with another data network (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 130, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 145. The mobile core network 140 also includes multiple control plane functions including, but not limited to, an Access and Mobility Management Function ("AMF") 141 that serves the RAN 120, a Session Management Function ("SMF") 143, and a Policy Control Function ("PCF") 147. In certain embodiments, the mobile core network 140 may also include an Authentication Server Function ("AUSF"), a Unified Data Management function ("UDM") 149, a Network Repository Function ("NRF") (used by the various NFs to discover and communicate with each other over APIs), or other NFs defined for the 5GC.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. In certain embodiments, the various network slices may include separate instances of network functions, such as the SMF 143 and UPF 145. In some embodiments, the different network slices may share some common network functions, such as the AMF 141. The different network slices are not shown in FIG. 1 for ease of illustration, but their support is assumed.

While FIG. 1 depicts components of a 5G RAN and a 5G core network, the described embodiments for activating a bandwidth part in response to receiving a control element 125 apply to other types of communication networks, including IEEE 802.11 variants, UMTS, LTE variants, CDMA 2000, Bluetooth, and the like. For example, in an LTE/EPC variant, the AMF 141 may be mapped to an MME, the SMF 143 may be mapped to a control plane portion of a PGW, the UPF 145 may be mapped to a STW and a user plane portion of the PGW, etc.

Generally, a remote unit 105 receives a control element 125 for activating a bandwidth part. In some embodiments, the control element 125 is a MAC CE. In one embodiment, the control element 125 includes a first parameter that indicates an activation/deactivation status of one or more configured serving cells and a second parameter that indicates an activation/deactivation status of BWPs configured in the serving cells. In another embodiment, the control element 125 includes a first parameter that identifies a serving cell and a second parameter that indicates an activation/deactivation status of BWPs configured in the identified serving cell. Here, a base unit 110 may communicate the activation/deactivation status for the serving cells independently from the activation/deactivation status for the BWPs of an active serving cell. In other embodiments, the control element 125 is DCI. Upon receiving the control element 125, the remote unit 105 activates, deactivates, or switches bandwidth parts according to the indicated statuses.

Figure 2:
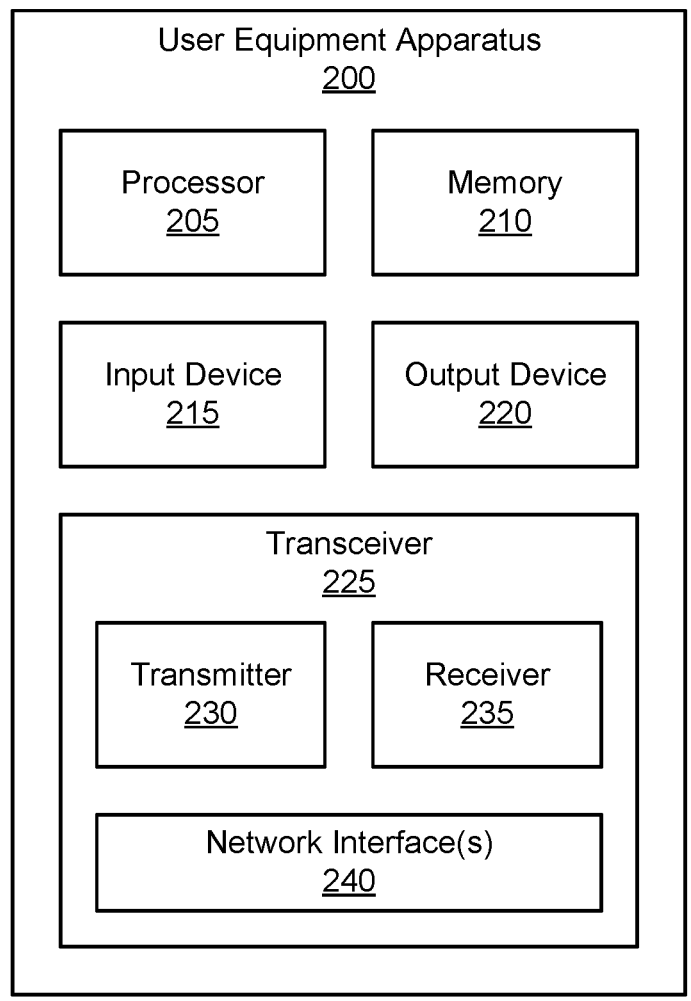
FIG. 2 is a schematic block diagram illustrating one embodiment of a user equipment apparatus that may be used for activating a bandwidth part.

FIG. 2 depicts a user equipment apparatus 200 that may be used for activating a bandwidth part, according to embodiments of the disclosure. The user equipment apparatus 200 may be one embodiment of the remote unit 105, described above. Furthermore, the user equipment apparatus 200 may include a processor 205, a memory 210, an input device 215, an output device 220, a transceiver 225 for communicating with one or more base units 110.

As depicted, the transceiver 225 may include a transmitter 230 and a receiver 235. The transceiver 225 may also support one or more network interfaces 240, such as the Uu interface used to communicate with a gNB, or another suitable interface for communicating with the RAN 120. In some embodiments, the input device 215 and the output device 220 are combined into a single device, such as a touchscreen. In certain embodiments, the user equipment apparatus 200 may not include any input device 215 and/or output device 220.

The processor 205, in one embodiment, may include any known controller capable of executing computer-readable instructions and/or capable of performing logical operations. For example, the processor 205 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 205 executes instructions stored in the memory 210 to perform the methods and routines described herein. The processor 205 is communicatively coupled to the memory 210, the input device 215, the output device 220, and the transceiver 225.

In various embodiments, the transceiver 225 receives a control element from a base unit associated with an active serving cell. In certain embodiments, the control element is DCI. In certain embodiments, the control element is a MAC CE.

The processor 205 determines an 'activation/deactivation' status of a set of BWPs configured in the active serving cell using the control element. Moreover, the processor 205 selectively activates a first BWP from the set of BWPs in the active serving cell based on the determined activation/deactivation status. Here, 'selectively activating' a BWP may include: 1) activating one or more BWP indicated by the control element, 2) deactivating one or more BWPs indicated by the control element, or 3) switching one or more BWPs indicated by the control element. Switching a BWP involves activating one or more BWPs while also deactivating an equal number of BWPs. In contrast, activating a BWP may involve activating a BWP without also deactivating a BWP.

Note that if multiple active BWPs is not supported, then BWP activation is the same as switching BWPs. In some embodiments, the user equipment apparatus 200 may be configured by the network to interpret an "activation" instruction as a command to switch BWPs. In other embodiments, the user equipment apparatus 200 may be configured by the network to interpret an "activation" instruction as a command to activate an additional BWP.

In some embodiments, the active serving cell is configured with a plurality of BWPs and the processor 205 deactivates a second BWP from the set of BWPs in the active serving cell based on a status indicated by the control element. In such embodiments, the control element may include a first parameter indicating a status for at least one serving cell and a second parameter indicating activation/deactivation statuses for a plurality of BWPs. Here, determining the activation/deactivation status of the first BWP includes: identifying a portion of the second parameter corresponding to an active serving cell (e.g., identifying a bitmap corresponding active serving cell) and identifying the activation/deactivation status of the first BWP indicated by the identified portion of the second parameter.

In certain embodiments, the user equipment apparatus 200 is configured with one or more serving cells, each configured serving cell being configured with one or more BWPs. In such embodiments, the second parameter includes a bitmap for each configured serving cell, each bitmap indicating an activation/deactivation status of the one or more BWPs of the configured serving cell. In one embodiment, the processor 205 determines whether each configured serving cell is activated based on the first parameter and ignores a bitmap in the second parameter corresponding to a deactivated serving cell.

In certain embodiments, the control element indicates multiple active serving cells, each active serving cell being configured with one or more BWPs. In such embodiments, the second parameter may include a bitmap for each active serving cell, with bitmap indicating the activation/deactivation status of the one or more BWPs of the configured serving cell.

In certain embodiments, the active serving cell is configured with a number of BWPs. Here, a size of the portion of the second parameter corresponding to the active serving cell is based on the number of BWPs. In certain embodiments, the first method includes receiving DCI including a BWP indicator field. Here, a size of the portion of the second parameter corresponding to the active serving cell is based on a size of the BWP indicator field.

In certain embodiments, the processor 205 activates a first serving cell based on the status indicated by the first parameter. In such embodiments, activating the first serving cell includes activating at least one BWP indicated by a portion of the second parameter corresponding to the first serving cell (e.g., a bitmap corresponding to the first serving cell). In certain embodiments, the portion of the second parameter corresponding to the active serving cell includes a first bitmap indicating the activation/deactivation status of a set of uplink BWPs and a second bitmap indicating the activation/deactivation status of a set of downlink BWPs.

In some embodiments, the control element includes a first parameter identifying the serving cell and a second parameter indicating activation/deactivation statuses for a set of BWPs of the identified serving cell. In such embodiments, the processor 205 determines the activation/deactivation status of the set of BWPs in the active serving cell using the second parameter. In certain embodiments, the second parameter includes a bitmap indicating the activation/deactivation status of each BWP of the identified serving cell. Here, each BWP may be associated with a BWP index, with each field of the bitmap corresponding to one BWP index. In some embodiments, the second parameter includes a first bitmap indicating the activation/deactivation status of a set of uplink BWPs and a second bitmap indicating the activation/deactivation status of a set of downlink BWPs.

In certain embodiments, the size of the second parameter is based on the number of BWPs configured for the indicated serving cell. In certain embodiments, the set of BWPs includes the BWPs configured for the indicated serving cell. In certain embodiments, the transceiver 225 receives DCI, including a BWP indicator field. In such embodiments, the size of the second parameter is based on the size of the BWP indicator field.

In some embodiments, the processor 205 determines an activation/deactivation status for the serving cell that is identified by the first parameter. Here, selectively activating the first BWP includes the processor 205 activating the first BWP in response to both the activation/deactivation status for the serving cell being an active status and the activation/deactivation status for the first BWP being an active status. In certain embodiments, the processor 205 ignores an indicated activation/deactivation status for a serving cell that is not active. In certain embodiments, the processor 205 determines whether the serving cell that is identified by the first parameter is active and, if not active, then the processor 205 activates the serving cell indicated by the first parameter.

In some embodiments, the transceiver 225 receives the control element via the active serving cell. Here, the control element includes a bitmap indicating activation/deactivation statuses for the set of configured BWPs of the active serving cell. In such embodiments, the processor 205 may determine the activation/deactivation status of each BWP of the active serving cell using the bitmap.

In some embodiments, the control element includes a BWP indicator field in DCI, where the DCI is received on a current active BWP and the BWP indicator field indicates the first BWP. In further embodiments, the processor 205 determines whether the current active BWP is to be deactivated using the BWP indicator field and a switching indicator in the DCI. For example, the switching indicator may be flag in the DCI which indicates whether to switch to or whether to activate the bandwidth indicted by the bandwidth indicator field. Here, the processor 205 switches from the current active BWP to the first BWP in response to determining current BWP is not to be deactivated that the current active BWP is to be deactivated (e.g., where the flag indicates to switch BWP). In contrast, if the processor 205 determines that the current active BWP is not to be deactivated (e.g., where the flag indicates to activate an additional BWP) then the processor 205 activates the first BWP while maintaining active the current active bandwidth.

In some embodiments, the DCI includes a resource allocation. In such embodiments, the processor 205 may determine whether the resource allocation is valid. Here, determining an activation/deactivation status of the first BWP may include determining the first BWP is to be deactivated in response to the resource allocation being invalid.

In certain embodiments, the DCI includes a field indicating whether transmission is to occur on the first BWP prior to deactivation of the first BWP. In certain embodiments, the DCI includes a field indicating whether transmission is to occur on the current active BWP prior to selectively activating the first BWP. In one embodiment, the resource allocation in the DCI applies to the first BWP. In another embodiment, the DCI is received on a current BWP and the resource allocation in the DCI applies to the current active BWP.

In certain embodiments, the processor 205 may determine whether the resource allocation is an uplink resource or a downlink resource. In one embodiment, the BWP indicator field indicates an uplink BWP when the resource allocation is an uplink resource, and the BWP indicator field indicates a downlink BWP when the resource allocation is a downlink resource. In further embodiments, the processor 205 determines whether the resource allocation has a first format or a second format. In one embodiment, the BWP indicator field indicates an uplink BWP in response to the resource allocation having the first format and indicates a downlink BWP in response to the resource allocation having the second format.

In certain embodiments, the DCI contains timing information. In such embodiments, selectively activating the first BWP may include performing, at a time indicated by the timing information, one of: activating the first BWP, switching to the first BWP, and deactivating the first BWP. In various embodiments, the BWP indicator field includes a bitmap indicating an activation/deactivation status of each BWP configured for the serving cell.

In certain embodiments, the DCI further includes a flag indicating whether the BWP indicator field applies to both uplink and downlink. In such embodiments, selectively activating the first BWP includes activating a downlink BWP and a linked uplink BWP in response to the flag indicating that the BWP indicator field applies to both uplink and downlink.

In certain embodiments, the DCI is received on a current BWP. In such embodiments, the processor 205 may further receive an RRC message indicating whether the apparatus is to switch BWPs in response to receiving the DCI containing the BWP indicator field. Here, selectively activating the first BWP includes the processor 205 activating the first BWP and, if the RRC message indicates the apparatus is to switch BWPs, then deactivating the current BWP, and otherwise maintaining active the current bandwidth.

In some embodiments, the processor 205 detects the expiry of an inactivity timer associated with the active serving cell (e.g., a cell-level inactivity timer). Here, the inactivity timer is started (or reset) in response to receiving control signaling indicating a resource allocation in the serving cell.

In one embodiment, the processor 205 switches to a default BWP (e.g., default DL BWP) in the active serving cell in response to expiry of the cell-level inactivity timer by activating the default BWP and deactivating all other BWPs in the set of BWPs configured for the active serving cell. In another embodiment, the processor 205 deactivates each BWPs in the set of BWPs configured for the active serving cell in response to expiry of the cell-level inactivity timer (e.g., without activating the default BWP).

In some embodiments, the processor 205 detects the expiry of a first inactivity timer associated with the first BWP (e.g., a BWP-level inactivity timer). Here, each BWP in the set of BWPs configured for the active serving cell may be associated with a separate inactivity timer. Moreover, a BWP-level inactivity timer may be started (or reset) in response to receiving a resource allocation for the associated BWP.

In one embodiment, the processor 205 deactivates the first BWP upon expiry of the first inactivity timer. In such embodiments, the processor 205 may also determine whether at least one BWP in the set of BWPs is active and switch to a default BWP if no other BWP in the set of BWPs is active. In another embodiment, the processor 205 deactivates each BWP in the set of BWPs configured for the active serving cell upon expiry of the first inactivity timer. In such embodiments, the processor 205 may also switch to a default BWP in response to expiry of the first inactivity timer.

As discussed above, the user equipment apparatus 200 may be a UE operating in a mobile communication system, such as one compliant with the 5G/NR standard. As such, the control element is received from a base unit of the mobile communication system, such as a gNB.

The memory 210, in one embodiment, is a computer readable storage medium. In some embodiments, the memory 210 includes volatile computer storage media. For example, the memory 210 may include a RAM, including dynamic RAM ("DRAM"), synchronous dynamic RAM ("SDRAM"), and/or static RAM ("SRAM"). In some embodiments, the memory 210 includes non-volatile computer storage media. For example, the memory 210 may include a hard disk drive, a flash memory, or any other suitable non-volatile computer storage device. In some embodiments, the memory 210 includes both volatile and non-volatile computer storage media.

In some embodiments, the memory 210 stores data related to activating a bandwidth part. For example, the memory 210 may store MAC CEs, activation/deactivation status for serving cells and/or BWP, and the like. In certain embodiments, the memory 210 also stores program code and related data, such as an operating system or other controller algorithms operating on the remote unit 105.

The input device 215, in one embodiment, may include any known computer input device including a touch panel, a button, a keyboard, a stylus, a microphone, or the like. In some embodiments, the input device 215 may be integrated with the output device 220, for example, as a touchscreen or similar touch-sensitive display. In some embodiments, the input device 215 includes a touchscreen such that text may be input using a virtual keyboard displayed on the touchscreen and/or by handwriting on the touchscreen. In some embodiments, the input device 215 includes two or more different devices, such as a keyboard and a touch panel.

The output device 220, in one embodiment, is designed to output visual, audible, and/or haptic signals. In some embodiments, the output device 220 includes an electronically controllable display or display device capable of outputting visual data to a user. For example, the output device 220 may include, but is not limited to, an LCD display, an LED display, an OLED display, a projector, or similar display device capable of outputting images, text, or the like to a user. As another, non-limiting, example, the output device 220 may include a wearable display separate from, but communicatively coupled to, the rest of the user equipment apparatus 200, such as a smart watch, smart glasses, a heads-up display, or the like. Further, the output device 220 may be a component of a smart phone, a personal digital assistant, a television, a table computer, a notebook (laptop) computer, a personal computer, a vehicle dashboard, or the like.

In certain embodiments, the output device 220 includes one or more speakers for producing sound. For example, the output device 220 may produce an audible alert or notification (e.g., a beep or chime). In some embodiments, the output device 220 includes one or more haptic devices for producing vibrations, motion, or other haptic feedback. In some embodiments, all or portions of the output device 220 may be integrated with the input device 215. For example, the input device 215 and output device 220 may form a touchscreen or similar touch-sensitive display. In other embodiments, the output device 220 may be located near the input device 215.

The transceiver 225 includes at least transmitter 230 and at least one receiver 235. One or more transmitters 230 may be used to provide UL communication signals to a base unit 110. Similarly, one or more receivers 235 may be used to receive DL communication signals from the base unit 110, as described herein. Although only one transmitter 230 and one receiver 235 are illustrated, the user equipment apparatus 200 may have any suitable number of transmitters 230 and receivers 235. Further, the transmitter(s) 225 and the receiver(s) 230 may be any suitable type of transmitters and receivers. In one embodiment, the transceiver 225 includes a first transmitter/receiver pair used to communicate with a mobile communication network over licensed radio spectrum and a second transmitter/receiver pair used to communicate with a mobile communication network over unlicensed radio spectrum.

According to a first solution, the activation (or respectively, deactivation) of a bandwidth part ("BWP") is signaled together with the activation/deactivation of a serving cell. This solution is illustrated in FIGS. 3-6. The activation/deactivation status of one or more configured serving cells is indicated by a first parameter. In certain embodiments, the first parameter is a first bitmap is used to indicate the activation/deactivation status of the configured serving cells. Here, each field/bit of the bitmap indicates the activation/deactivation status of a serving cell with index i configured for the MAC entity.

In some embodiments, the serving cells may be ordered according to their serving cell indices. In certain embodiments, the bit/field may be set to "1" to indicate that the serving cell with the index i is to be activated (or reactivated/remain activated in the case that it was already in the activated state), and set to "0" to indicate that the serving cell with index i is to be deactivated (or remain deactivated in the case that it was already in the deactivated state). Alternatively, a value of "0" may be used to indicate activation, and the value "1" used to indicate deactivation.

For each serving cell for which the corresponding field indicates an activated serving cell, e.g., set to "1", the MAC control element contains a further bitmap (e.g., a cell-specific bitmap) indicating the activation/deactivation status of the BWP(s) configured for the corresponding serving cell. The cell-specific bitmaps form a second parameter.

The UE may be configured with one or more BWPs. In some implementations, a UE may be configured with up to 4 BWP(s) per serving cell. In other implementations the UE may be configured with more BWP(s) per serving cell.

Each configured BWP is associated with a BWP_index. Each field of the cell-specific bitmap indicates the activation/deactivation status of the BWP associated with BWP_index j. In certain embodiments, if there is no configured BWP with BWP_index j, then the MAC entity is to ignore the corresponding field. In some embodiments, the field is set to "1" to indicate that the BWP with BWP_index j is to be activated and set to "0" to indicate that the BWP with BWP_index j is to be deactivated. Alternatively, a value of "0" may be used to indicate activation, and the value "1" used to indicate deactivation.

The MAC CE may have one of the following formats. In a first MAC CE format, the number of BWP fields is based on the number of activated serving cells. Thus, for each active serving cell, there is a further bitmap $B_1 \ldots B_N$, indicating which BWPs are activated/deactivated. In certain embodiments, the size of the BWP field (e.g., bitmap) for a serving cell depends on the number of configured BWPs for that cell, e.g., in the case where there are only 3 BWP(s) configured for a serving cell, there would be only $B_1 \ldots B_3$ for that serving cell in the MAC CE. In a second MAC CE format, the number of BWP fields does not depend on the number of activated serving cells, but on the number of configured cells. Here, if a cell is deactivated, the corresponding cell-specific bitmap is ignored.

In a third MAC CE format, the size of the BWP field for a serving cell depends on the configured size for the bandwidth part (BWP) indicator field in the DCI. For example, if the size of the BWP indicator equals 0 bits, then there will be no BWP field for that serving cell in the MAC CE. In another example, if the size of the BWP indicator is 1 bit, then the BWP field will have 2 bits ($B_1 \ldots B_2$) for that serving cell in the MAC CE. In a third example, if the size of the BWP indicator is 2 bits, then the BWP field will be represented by four bits ($B_1 \ldots B_4$) for that serving cell in the MAC CE. With exception for the 0 bit case, the number of BWP bits in the MAC CE is $2^N$, where N is the number of BWP bits of the BWP indicator in the DCI.

In response to receiving a combined serving cell/BWP activation/deactivation MAC CE, the UE activates (or reactivates) the serving cell(s) according to the value of the fields e.g., the UE performs the actions related to an (re)activation of a SCell. In certain embodiments, $C_0$—referring to the primary cell—may be always set to "1". In addition, when (re)activating a serving cell, the UE activates the configured BWP(s) as indicated by the BWP status fields ($B_j$) for this serving cell. Thus, the MAC CE allows the gNB to indicate the activation of a serving cell and the activation/deactivation of the BWP(s) of this serving cell at the same time.

Figure 3:
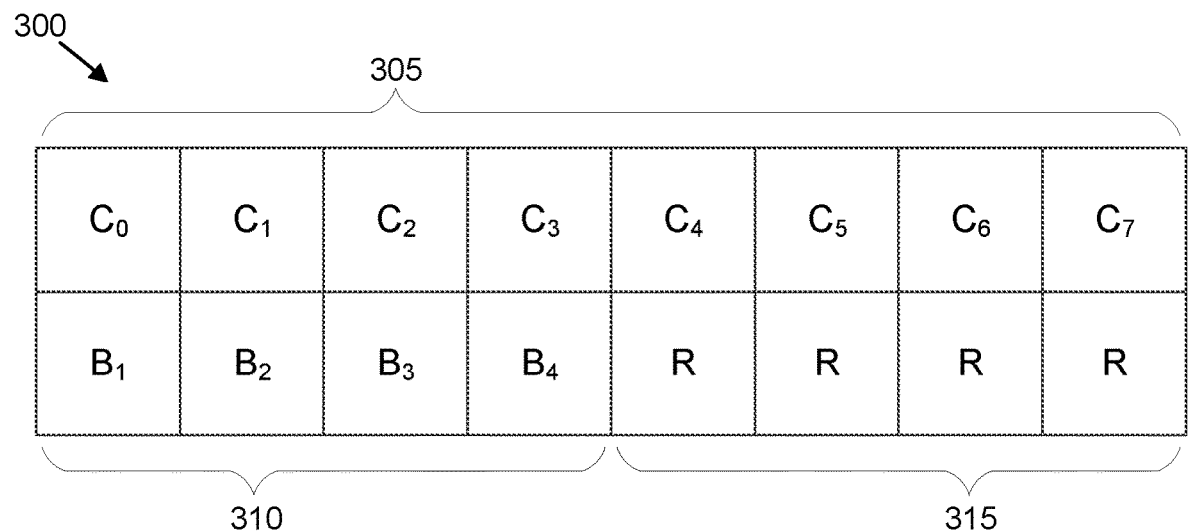
FIG. 3 is a block diagram illustrating a MAC CE indicating the activation/deactivation status of configured BWP(s) for one activated serving cell.

FIG. 3 depicts a first control element 300, according to embodiments of the disclosure. The first control element 300 includes a first bitmap 305 with fields $C_0$ to $C_7$ indicate the activation/deactivation status of the serving cell with index i (i=0 . . . 7). In the depicted embodiment, a UE can be configured with up to 8 serving cells.

According to one embodiment, $C_0$ refers to the activation/deactivation status of the PCell (or PSCell), e.g., index 0 is used for the primary cell, indices 1 . . . 7 are used for SCells, e.g., secondary serving cells. In various embodiments, the field $C_0$ is always set to "1", e.g., the PCell/PSCell is always activated. Additionally, for each $C_i=1$ (indicating and activated serving cell), there is a further bitmap $B_1 \ldots B_4$, where advantageously the first such bitmap refers to the first serving cell $C_i=1$, the second such bitmap (if present) refers to the second active serving cell, and so forth.

The depicted embodiment shows a MAC CE format for the case of one activated serving cell, e.g., the PCell $C_0$. Accordingly, the first control element 300 includes a second parameter 310 containing a BWP bitmap for each active serving cell. In the depicted embodiment, the control element 300 also contains a reserved field 315 with reserved bits ("R") in the MAC CE which is currently unused, e.g., it could be used in future releases, and/or set to some predefined value such as "1".

Figure 4:
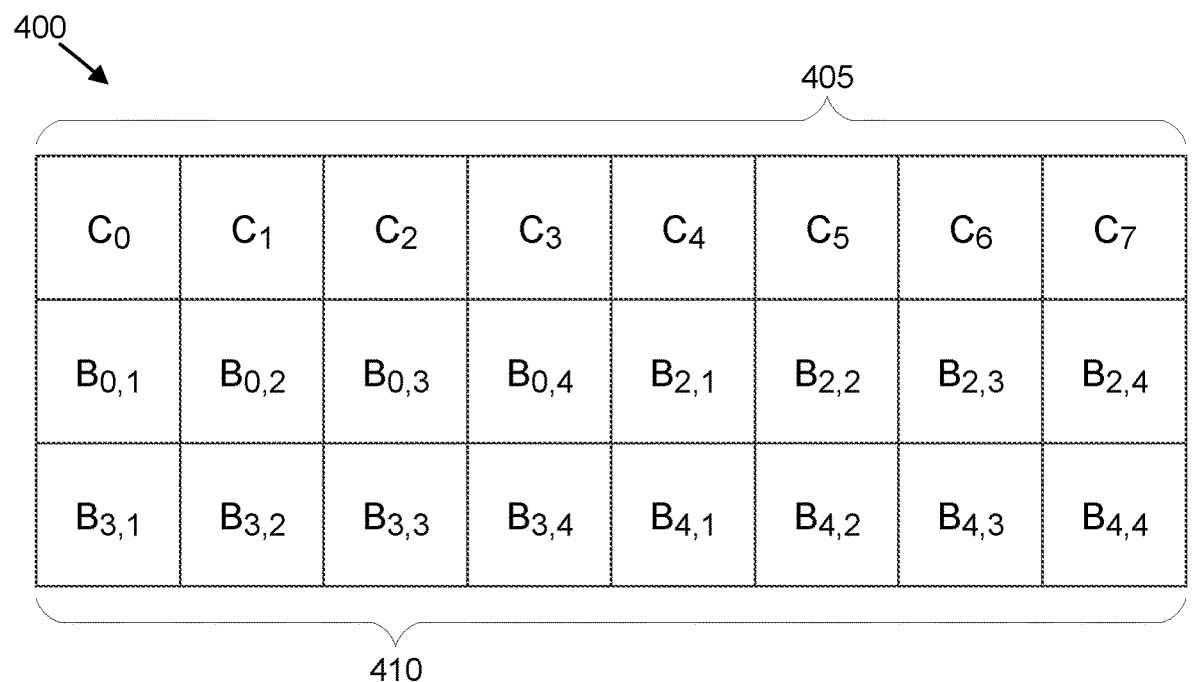
FIG. 4 is a block diagram illustrating a MAC CE indicating the activation/deactivation status of configured BWP(s) for four activated serving cells.

FIG. 4 depicts a second control element 400, according to embodiments of the disclosure. The second control element 400 includes a first bitmap 405 with fields $C_0$ to $C_7$ that indicate the activation/deactivation status of the serving cell with index i (i=0 . . . 7). In one embodiment, the second control element 400 is sized according to the second MAC CE format number of configured BWPs for that cell, as discussed above. Here, it is assumed that each serving cell is configured with four BWPs. According to one embodiment, $C_0$ refers to the activation/deactivation status of the PCell (or PSCell), e.g., index 0 is used for the primary cell, indices 1 . . . 7 are used for SCells, e.g., secondary serving cells.

The second control element 400 also contains a second parameter 410 indicating the activation/deactivation status of a plurality of BWPs. In the depicted embodiment, for each $C_i=1$, there is a further bitmap $B_1 \ldots B_4$, where the first such bitmap refers to the first serving cell $C_i=1$, the second such bitmap (if present) refers to the second serving cell $C_i=1$, and so forth. FIG. 4 shows a MAC CE format for the case of four activated serving cells, e.g., PCell and three SCells. The second parameter 410 includes a first bitmap $B_1 \ldots B_4$ corresponding to a first active cell (e.g., cell index 0), a second bitmap $B_1 \ldots B_4$ corresponding to a second active cell (here, cell index 2), a third bitmap $B_1 \ldots B_4$ corresponding to a third active cell (here, cell index 3), and a fourth bitmap $B_1 \ldots B_4$ corresponding to a fourth active cell (here, cell index 4).

FIGS. 3 and 4 assume that DL and UL BWP(s) configured for a serving cell have some linkage, e.g., there is an association between a DL BWP and a corresponding UL BWP. Therefore, one bit is enough to indicate the activation/deactivation status of a DL BWP and the associated UL BWP, e.g., DL and UL BWP is jointly activated/deactivated.

Figure 5:
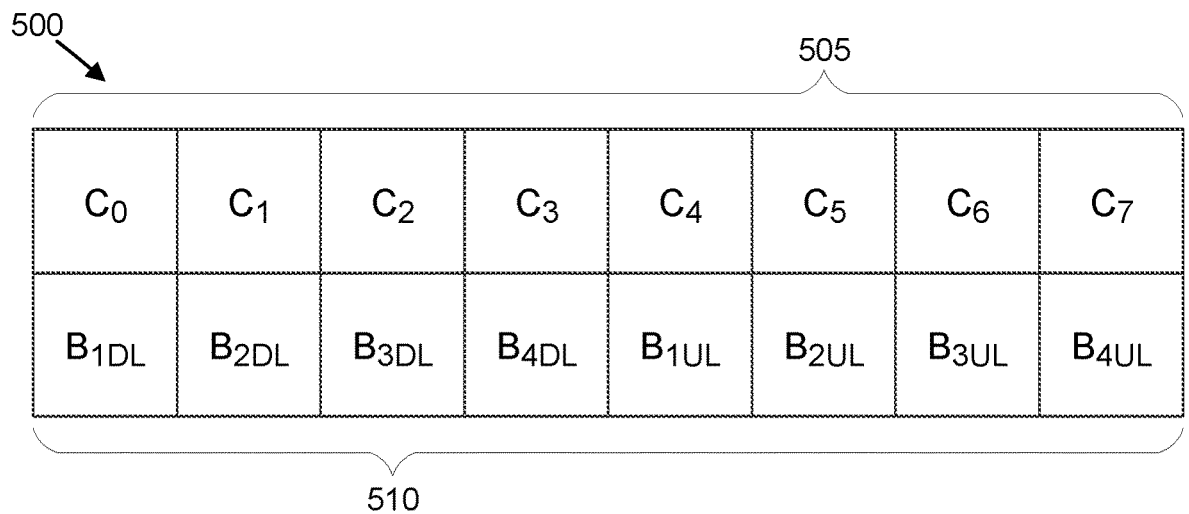
FIG. 5 is a block diagram illustrating a MAC CE indicating the activation/deactivation status of configured DL and UL BWP(s) for one activated serving cell.

FIG. 5 depicts a third control element 500, according to embodiments of the disclosure. The third control element 500 includes a first bitmap 505 with fields $C_0$ to $C_7$ that indicate the activation/deactivation status of the serving cell with index i (i=0 . . . 7). In the depicted embodiment, a UE can be configured with up to 8 serving cells. According to one embodiment, $C_0$ refers to the activation/deactivation status of the PCell (or PSCell), e.g., index 0 is used for the primary cell, indices 1 . . . 7 are used for SCells, e.g., secondary serving cells. In various embodiments, the field $C_0$ is always set to "1", e.g., the PCell/PSCell is always activated. Here, the size of the MAC CE depends on the number of activated serving cells, e.g., the number of $C_i$ that are set to "1". Moreover, the size of the BWP field for a serving cell depends on the number of configured BWPs for that cell, e.g., in the case where there are only 3 BWP(s) configured for a serving cell, there would be only $B_1$ . . . $B_3$ for that serving cell in the MAC CE.

The third control element 500 also includes a second parameter 510 indicating the activation/deactivation status of a plurality of BWPs. Here, the third control element 500 contains, for each activated serving cell, one bitmap indicating the activation/deactivation status of the DL BWP(s) and one bitmap indicating the activation/deactivation status of the UL BWP(s). This allows the gNB to independently control the activation/deactivation status of the DL and UL BWP(s) of a serving cell. In the depicted embodiment, for each $C_i$=1, there is a DL BWP bitmap $B_{1DL}$ . . . $B_{4DL}$ and a UL BWP bitmap $B_{1UL}$ . . . $B_{4UL}$, where the first pair of DL BWP and UL BWP bitmaps refers to the first serving cell $C_i$=1, the second such bitmap pair (if present) refers to the second serving cell $C_i$=1, and so forth. FIG. 5 shows a MAC CE format for the case of one activated serving cell, e.g., PCell.

Figure 6:
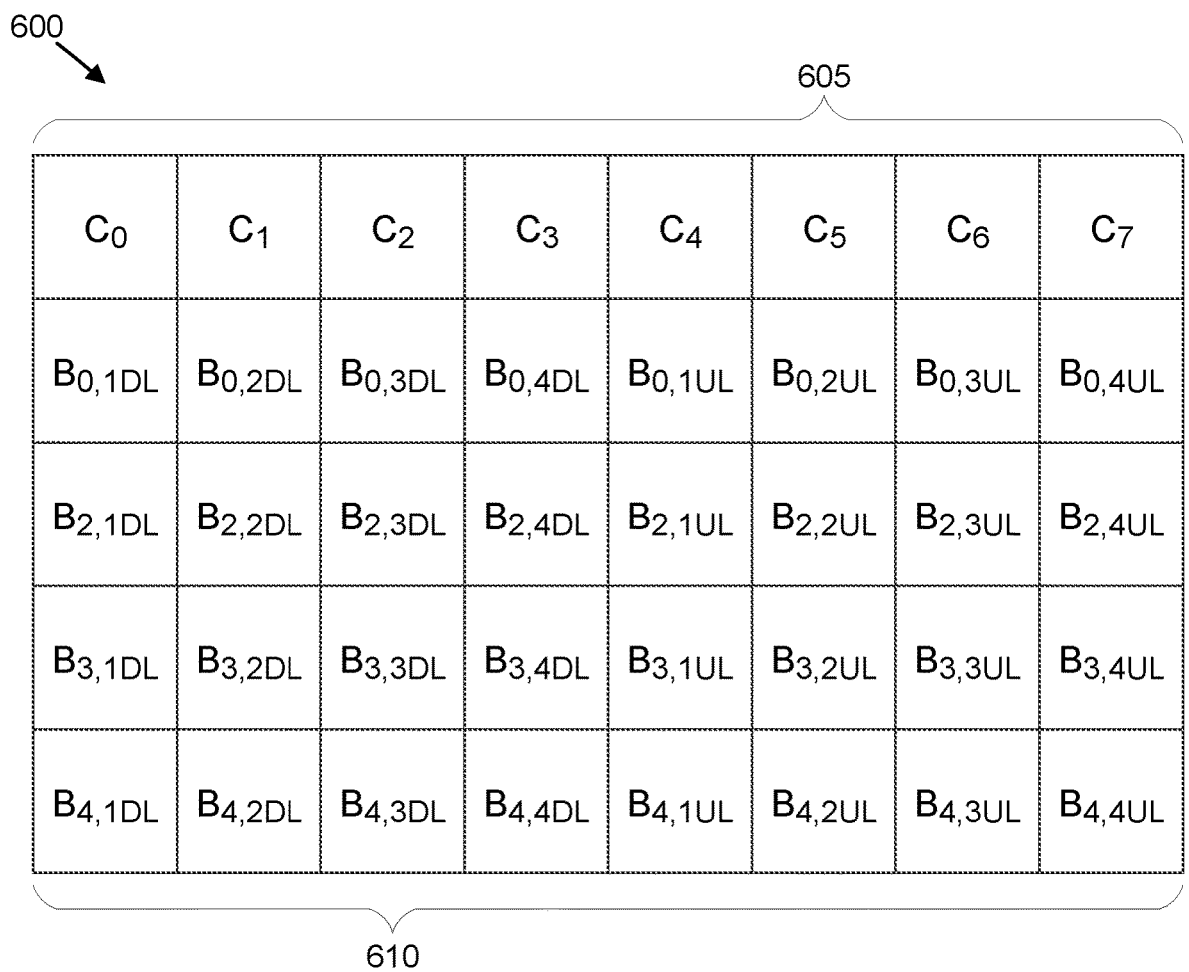
FIG. 6 is a block diagram illustrating a MAC CE indicating the activation/deactivation status of configured DL and UL BWP(s) for four activated serving cells.

FIG. 6 depicts a fourth control element 600, according to embodiments of the disclosure. The fourth control element 600 includes a first bitmap 605 with fields $C_0$ to $C_7$ that indicate the activation/deactivation status of the serving cell with index i (i=0 . . . 7). In the depicted embodiment, a UE can be configured with up to 8 serving cells. According to one embodiment, $C_0$ refers to the activation/deactivation status of the PCell (or PSCell), e.g., index 0 is used for the primary cell, indices 1 . . . 7 are used for SCells, e.g., secondary serving cells. In various embodiments, the field $C_0$ is always set to "1", e.g., the PCell/PSCell is always activated. Here, the size of the MAC CE depends on the number of activated serving cells, e.g., the number of $C_i$ that are set to "1." Moreover, the size of the BWP field for a serving cell depends on the number of configured BWPs for that cell, e.g., in the case where there are only 3 BWP(s) configured for a serving cell, there would be only $B_1$ . . . $B_3$ for that serving cell in the MAC CE.

The fourth control element 600 also includes a second parameter 610 indicating the activation/deactivation status of a plurality of BWPs. Here, the fourth control element 600 contains, for each activated serving cell, one bitmap indicating the activation/deactivation status of the DL BWP(s) and one bitmap indicating the activation/deactivation status of the UL BWP(s).

FIG. 6 shows a MAC CE format for the case of four activated serving cells, e.g., the PCell and three SCells. In the depicted embodiment, for each $C_i$=1, there is a DL BWP bitmap $B_{1DL}$ . . . $B_{4DL}$ and a UL BWP bitmap $B_{1UL}$ . . . $B_{4UL}$, where the first pair of DL BWP and UL BWP bitmaps refers to the first serving cell where $C_i$=1 (here cell index 0), the second such bitmap pair refers to the second active serving cell where $C_i$=1 (here, cell index 2), and so forth.

The MAC CE formats depicted in FIG. 3-6 use a single MAC CE to indicate both the activation/deactivation of a serving cell and activation/deactivation of BWP for each active serving cell. Alternatively, and according to a further embodiment, there is one MAC CE, e.g., identified by one logical channel ID, which is used to activate/deactivate a serving cell and an additional separate MAC CE used to activate/deactivate the configured BWP(s) of a serving cell.

Moreover, while FIG. 5-6 depicts a single MAC CE to indicate the activation/deactivation of both the DL BWP and UL BWP for each active serving cell, alternatively, and according to a further embodiment, there is one MAC CE, e.g., identified by one logical channel ID, which is used to activate/deactivate the configured DL BWP(s) of a serving cell and an additional separate MAC CE, e.g., identified by a different logical channel ID, which is used to activate/deactivate the configured UL BWP(s) of a serving cell. Alternatively, there may be a MAC CE, e.g., identified by one logical channel ID, which is used to activate/deactivate a serving cell and the configured UL BWP(s) of a serving cell and an additional separate MAC CE, e.g., identified by a different logical channel ID, which is used to activate/deactivate a serving cell and the configured DL BWP(s) of a serving cell.

In a second solution, the activation/deactivation status of the BWP(s) configured for a serving cell is signaled separately from the activation/deactivation status of the configured serving cell(s). Here, the activation/deactivation of a serving cell, such as SCell, is done by an independent procedure. In various embodiments of the second solution, the BWP activation/deactivation MAC CE contains a bitmap indicating the activation/deactivation status of the BWP(s) configured for a serving cell.

As mentioned above, a UE may be configured with up to 4 BWP(s) per serving cell, each configured BWP is associated with a BWP_index. Thus, each field of the bitmap indicates the activation/deactivation status of the BWP associated with BWP_index j. In the case that there is no configured BWP with BWP_index j, the MAC entity ignores the corresponding field of the bitmap. In some embodiments, each field, e.g., Bi, is set to "1" to indicate that the BWP with BWP_index j is to be activated and set to "0" to indicate that the BWP with BWP_index j is to be deactivated. Alternatively, a value of "0" may be used to indicate activation, and the value "1" used to indicate deactivation.

In various embodiments, the MAC CE contains a field/parameter which indicates the serving cell to which the BWP activation/deactivation bitmap applies to. Exemplary MAC CE format according to the second solutions are shown in FIGS. 7-8.

In general, there may be several alternatives for the MAC CE format. In one embodiment, the number of BWP field is based on the number of activated serving cells. In another embodiment, the number of BWP fields does not depend on the number of activated serving cells, but on the number of configured cells. If a cell is deactivated, the corresponding $B_1$ . . . $B_4$ are ignored.

Figure 7:
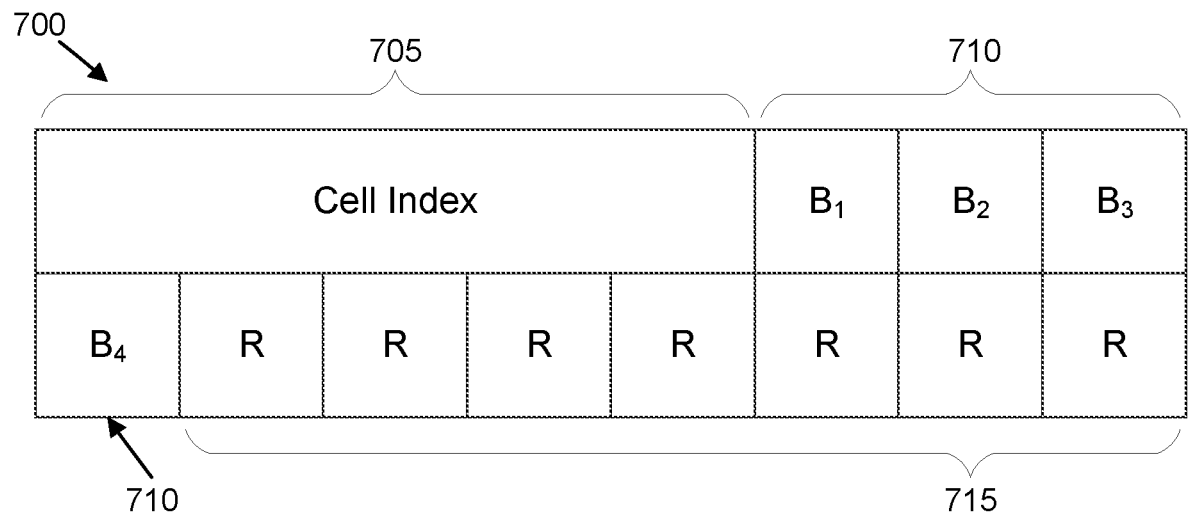
FIG. 7 is a block diagram illustrating a BWP activation/deactivation MAC CE.
Figure 8:
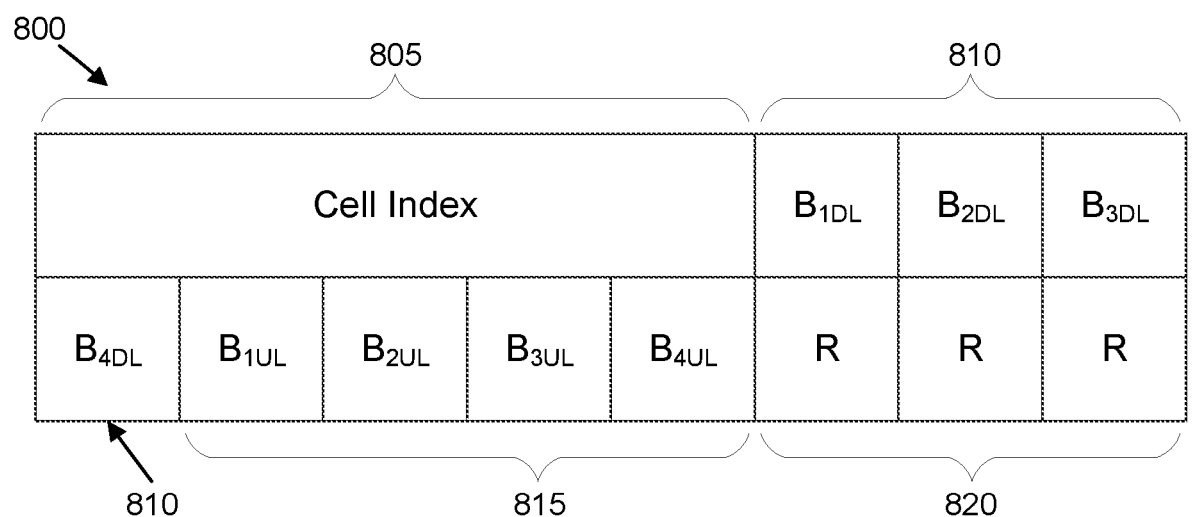
FIG. 8 is a block diagram illustrating a DL BWP and UL BWP activation/deactivation MAC CE.

In various formats, the size of the BWP field for a serving cell, e.g., 4-bits in the exemplary MAC CE format shown in FIG. 7, depends on the number of configured BWPs for that cell, e.g., in the case that there are only 3 BWP(s) configured for a serving cell, there would be only $B_1 \ldots B_3$ for that serving cell in the MAC CE. In other formats, the size of the BWP field for a serving cell depends on the configured size for the Bandwidth part (BWP) indicator field in the DCI, e.g., if the size of the BWP indicator equals 0 bits, then there will be no BWP field for that serving cell in the MAC CE; similarly if the size BWP indicator is 1 bit, then the BWP field will have 2 bits ($B_1 \ldots B_2$) for that serving cell in the MAC CE; if the size of the BWP indicator is 2 bit, then the BWP field will be represented by four bits ($B_1 \ldots B_4$) for that serving cell in the MAC CE. In general, and with exception to the 0 bit case, the number of BWP bits in the MAC CE is $2^N$, where N is the number of BWP bits in the DCI).

FIG. 7 depicts a fifth control element 700, according to embodiments of the disclosure. The fifth control element 700 includes a cell index field 705 to refer to a serving cell whose activation/deactivation status is indicated by a separate MAC CE. The fifth control element 700 also includes a second parameter 710 with a bitmap indicating the activation/deactivation status of the configured BWPs for the identified cell. The size of the BWP field for a serving cell depends on the number of configured BWPs for that cell, e.g., in the case that there are only 3 BWP(s) configured for a serving cell, there would be only $B_1 \ldots B_3$ for that serving cell in the MAC CE. In the depicted embodiment, there is are fields $B_1 \ldots B_4$. The R field 715 refers to reserved bit in the MAC CE which is currently unused, e.g., it could be used in future releases, and set to some predefined value such as "1".

According to one embodiment, for cases when the Cell index refers to a deactivated serving cell, the UE is to ignore the BWP activation/deactivation information, e.g., no corresponding UE actions occur in response to receiving the MAC CE. According to another alternative embodiment, the UE activates the serving cell and subsequently activates/deactivates the BWP(s) as indicated within the MAC CE for the activated serving cell. This may be employed in conjunction with a later activation of the serving cell which does not include BWP activation information.

According to another embodiment, the Cell Index field is omitted within the BWP activation/deactivation MAC CE. In this case, the UE applies the BWP activation/deactivation info to the serving cell on which the BWP activation/deactivation MAC CE was received on.

According to a further embodiment, MAC control signaling is used to indicate the BWP activation/deactivation status for several serving cells. A first bitmap is used to indicate for which of the configured serving cells BWP information, e.g., activation/deactivation status, follows. More in particular, each field of the bitmap indicates the serving cell index i of a MAC entity. For each serving cell for which the corresponding field is set to "1", e.g., activated serving cell, the MAC control element contains a further bitmap indicating the activation/deactivation status of the BWP(s) configured for the corresponding serving cell.

Again, in 3GPP Rel-15 a UE can be configured with up to 4 BWP(s) per serving cell, each configured BWP is associated with a BWP_index. Each field of the bitmap indicates the activation/deactivation status of the BWP associated with BWP_index j. In the case that there is no configured BWP with BWP_index j, the MAC entity is to ignore the corresponding field. The field is set to "1" to indicate that the BWP with BWP_index j is to be activated. The field is set to "0" to indicate that the BWP with BWP_index j is to be deactivated.

For the case when the BWP activation/deactivation info is signaled for a deactivated serving cell, e.g., deactivated SCell, the UE ignores the corresponding BWP info, e.g., no further UE actions for a serving cell in response to receiving a BWP activation/deactivation MAC CE containing BWP information for a deactivated serving cell. Alternatively, and according to a certain embodiment UE stores the received BWP information for a deactivated serving cell. When gNB activates this serving cell later, UE may immediately activate/deactivate the BWP(s) according to the stored information.

As depicted in FIG. 8, the BWP activation/deactivation MAC CE may contain, according one further embodiment, one BWP bitmap for DL BWP(s) and one bitmap indicating the activation/deactivation status of the UL BWP(s) for a serving cell. This allows the gNB to independently control the activation/deactivation status of the DL and UL BWP(s) of a serving cell.

FIG. 8 depicts a sixth control element 800, according to embodiments of the disclosure. The sixth control element 800 includes a cell index field 805 to refer to a serving cell whose activation/deactivation status is indicated by a separate MAC CE. The sixth control element 800 also includes a second parameter with a bitmap 810 indicating the activation/deactivation status of the configured UL BWPs for the identified cell and a bitmap 815 indicating the activation/deactivation status of the configured DL BWPs for the identified cell. The size of the BWP field for a serving cell depends on the number of configured BWPs for that cell, e.g., in the case where there are only 3 BWP(s) configured for a serving cell, there would be only $B_1 \ldots B_3$ for that serving cell in the MAC CE. In the depicted embodiment, there is are fields $B_{1DL} \ldots B_{4DL}$ for the DL BWP and fields $B_{1UL} \ldots B_{4UL}$ for the UL BWP. The R field 820 refers to reserved bits in the MAC CE which is currently unused, e.g., it could be used in future releases, and set to some predefined value such as "1".

Alternatively, and according to a further embodiment, there may be one MAC CE, e.g., identified by one logical channel ID, for DL BWP activation/deactivation and one additional separate MAC CE, e.g., identified by a different logical channel ID, which is used to activate/deactivate the configured UL BWP(s) of a serving cell.

In a third solution, the control element 125 is DCI received in a serving cell, wherein the DCI is used to indicate the activation/deactivation of BWP(s) configured for a serving cell. For example, the Bandwidth part indicator field, which is—if configured—contained in e.g., DCI format 0_1 and DCI format 1_1, identifies the BWP of the set of configured BWP(s), e.g., configured by RRC signaling, to which the UE is to switch to. In various embodiments, the DCI, e.g., DCI format 0_1 or DCI format 1_1, contains one bit/flag indicating whether the BWP indicated by the bandwidth part indicator field is to be activated or whether the UE is to switch to the signaled BWP.

It should be noted that for the case of BWP switching, the BWP indicated by the bandwidth part indicator field is activated (or respectively, reactivated) when already active and the BWP on which the DCI is received is deactivated at a time. BWP activation means that the UE activates (respectively, reactivates) the BWP as indicated by the bandwidth part indicator without deactivating the BWP on which the DCI was received on. In the case of activating a (previously) deactivated BWP, this operation is equivalent to adding a BWP to the set of active BWPs.

In some embodiments, a DCI with an invalid resource allocation, e.g., a "Null" resource allocation, is used to indicate the deactivation of a BWP indicated by the Bandwidth part indicator field. For example, the DCI may indicate a specific the BWP by the bandwidth part indicator, and if the activation/switch flag/bit is set to "activation" while one or more fields of the DCI, e.g., the resource allocation related fields, are set to an invalid value (or, alternatively, are set to some predefined values), then the UE interprets the DCI as an instruction to deactivate the BWP indicated by the Bandwidth part indicator field. In contrast, if the activation/switch flag/bit is set to "activation" while one or more fields of the DCI, e.g., the resource allocation related fields, are set to a valid value, then the UE interprets the DCI as an instruction to deactivate the BWP indicated by the Bandwidth part indicator field.

In some embodiments, the DCI may contain timing information, e.g., denoted as which indicates when the BWP is to be activated/deactivated. For example, for a DCI received in slot 'n' which indicates the deactivation of a BWP, then the UE is to deactivate the indicated BWP in slot 'n+k,' where is the number of slots indicated by the timing information in DCI. As another example, for a DCI received in slot 'n' that indicates the switching of a BWP, then the UE is to switch to the indicated BWP in slot 'n+k,' where is the number of slots indicated by the timing information in DCI.

Switching/activation BWP in a paired spectrum may be done separately for DL and UL. In some embodiments, switching to a DL BWP (or activation of a DL BWP) is signaled by means of a DCI used to schedule a DL/PDSCH transmission, e.g., DCI format 1_1, whereas the switching (alternatively, activation) of an UL BWP is done by means of a DCI used to schedule a UL/PUSCH transmission, e.g., DCI format 0_1. In certain embodiments, a BWP switching/activation DCI contains one flag indicating whether the BWP related information is to be applied to both the UL and DL BWP.

For example, when receiving an DL DCI, e.g., DCI format 1_1, indicating the activation of an BWP with the additional flag set to "1", the UE is to activate the indicated DL BWP—as indicated by the bandwidth part indicator field—and the linked UL BWP, where the linkage between DL and UL BWP(s) may be configured/signaled by RRC signaling in a prior step. If the additional flag is set to "0", then the UE is to only activate the indicated DL BWP—as indicated by the bandwidth part indicator field.

According to a further embodiment, physical layer signaling (e.g., DCI) is used to indicate the activation/deactivation of BWP(s) configured for a serving cell. Current DCI formats support BWP switching. The Bandwidth part indicator field, which is—if configured—contained in e.g., DCI format 0_1 and DCI format 1_1, identifies the BWP of the set of configured BWP(s), e.g., configured by RRC signaling, to which the UE is to switch. According to one embodiment the DCI, e.g., DCI format 0_1 or DCI format 1_1, contains a field indicating one out of two or more of the following.

For a Switch BWP instruction, the field may indicate whether to a) transmit on resources of the BWP where the DCI is received (e.g., before switching); or b) transmit on resources of the BWP indicated by the Bandwidth part indicator field (e.g., after switching).

For an Activate BWP (or Reactivate BWP) instruction, the field may indicate whether to a) transmit on resources of the BWP where the DCI is received; or b) transmit on resources of the BWP indicated by the Bandwidth part indicator field (after activating).

For a Deactivate BWP instruction, the field may indicate whether to a) transmit on resources of the BWP where the DCI is received; b) transmit on resources of the BWP indicated by the Bandwidth part indicator field (e.g., before deactivating); or c) transmit on resources of the BWP indicated by the Bandwidth part indicator field.

In certain embodiments, DCI according to the above contains a 2-bit field, in order to distinguish between 4 different commands related to the BWP management of a serving cell. The details of the embodiment outlined in the following should be merely understood as one exemplary implementation of the embodiment, but not limit the scope of the embodiment.

According to one exemplary implementation of the embodiment, a first state represented by the 2-bit field in the DCI instructs the UE to activate the BWP part indicated by the bandwidth part indicator field. In the case where the BWP indicated by the bandwidth part indicator field is already activated, the UE reactivates the BWP. According to one implementation the resource allocation assignment contained in the DCI applies to the BWP indicated by the bandwidth part indicator field. Alternatively, the resource allocation assignment contained in the DCI applies to the BWP where the DCI was received on.

A second state represented by the two bit-field in the DCI instructs the UE to switch the BWP. Here, switching means to deactivate the BWP where the DCI is received and to activate the BWP indicated by the bandwidth part indicator field. According to one implementation, the resource allocation assignment contained in the DCI applies to the BWP indicated by the bandwidth part indicator field. Alternatively, the resource allocation assignment contained in the DCI applies to the BWP where the DCI was received on.

A third state represented by the 2-bit field in the DCI instructs the UE to deactivate the BWP as indicated by the bandwidth part indicator field. According to one implementation, the resource allocation assignment contained in the DCI applies to the BWP where the DCI was received on.

A fourth state represented by the 2-bit field in the DCI assigns radio resource, e.g., UL or DL resources, to the UE without changing the current set of active BWP(s). According to one implementation, the resource allocation assignment contained in the DCI applies to the BWP indicated by the bandwidth part indicator field. Alternatively, the resource allocation assignment contained in the DCI applies to the BWP where the DCI was received on. Note that the DCI could be a DCI format allocating uplink resources as well as a DCI format allocating downlink resources.

In various embodiments, higher layer signaling, such as Radio Resource Control (RRC) signaling, configures whether UE in response to receiving a DCI containing a bandwidth part indicator field is to switch the BWP or activate/deactivate a BWP. In the case that the higher layer configuration directs the UE to interpret a DCI containing a bandwidth part indicator field as a BWP switching command, UE in response to receiving such a DCI deactivates the BWP which the DCI is received on and activates the BWP indicated by the bandwidth part indicator field. In the case that the higher layer configuration directs the UE to interpret a DCI containing a bandwidth part indicator field as a BWP activation/deactivation command, UE in response to receiving such a DCI activates (or deactivates) the BWP indicated by the bandwidth part indicator field. According to one implementation, deactivation may be indicated by an invalid radio resource assignment information signaled within the DCI.

In various embodiments, physical layer signaling is used to indicate the activation/deactivation status of BWP(s) configured for a serving cell. Here, Downlink Control Information (DCI) may contains a bitmap indicating the activation/deactivation status of the BWP(s) configured for the corresponding serving cell. Each field of the bitmap indicates the activation/deactivation status of the BWP associated with BWP_index i. In the case that there is no configured BWP with BWP_index i, the UE is to ignore the corresponding field. In one embodiment, the field is set to "1" to indicate that the BWP with BWP_index i is to be activated and set to "0" to indicate that the BWP with BWP_index i is to be deactivated.

In one implementation, the bandwidth part indicator field is used to convey the activation/deactivation status of the BWP(s) configured for a serving cell, e.g., the bitwidth of the bandwidth part indicator is extended to signal the activation/deactivation of the BWP(s) configured for the serving cell. According to one implementation the resource allocation assignment contained in the DCI applies to the BWP indicated by the bandwidth part indicator field. Alternatively, the resource allocation assignment contained in the DCI applies to the BWP where the DCI was received on.

As mentioned above, when an BWP inactivity timer is configured for a serving cell, the expiry of the inactivity timer associated to that cell may cause the UE to switch the active BWP (e.g., active DL BWP) to a default BWP (e.g., default DL BWP) configured by the network. In the case that there are more than one active BWP(s) in a serving cell, each of the BWP may have an associated BWP inactivity timer (e.g., BWP-level inactivity timers). Alternatively, there may be just one BWP inactivity timer per UE per serving cell (e.g., a cell-level inactivity timer).

In the case of a BWP-level inactivity timer per active BWP(s) in a serving cell, the timer may be started independently for each of those BWP(s) according to some defined rules/events, e.g., PDCCH reception. For the case that there are multiple BWP(s) active and the BWP inactivity timer expires for one of the active BWP(s), the UE may deactivate the BWP for which the timer expired. When the BWP inactivity timer associated with the last activated BWP expires UE switches to the default BWP.

According to an alternative implementation, the UE deactivates the BWP for which the associated BWP inactivity timer expires and also activates the default BWP. In this embodiment, the other active BWP(s) for which the associated BWP inactivity timer is not expired are kept activated in addition to the default BWP. According to yet an alternative implementation, the UE deactivates all active BWP(s) of a serving cell and activates the default BWP in the case that at least one of the BWP-level inactivity timers expires.

In that case of just one BWP inactivity timer per UE per serving cell, upon expiry of the cell-level inactivity timer, the UE is to consider all the BWP configured for this serving cell to be in deactivated state and (re)activate only the default BWP for this serving cell. As an alternative embodiment, the UE can consider a serving cell to be deactivated when the BWP inactivity timer for this serving cell expires.

In various embodiments, the BWP inactivity timer is (re)started for a BWP for which the resource allocation assignment is applied to, for example in the case where a DCI is received which switches the BWP or activates an (additional) BWP, irrespective of on which BWP the said DCI is received. Alternatively, the BWP inactivity timer may be (re)started for the BWP where the DCI which commands the UE to switch/activate a BWP is received on.

According to another embodiment the higher layer signaling, e.g., Radio Resource Control (RRC) signaling, is used to configure multiple BWP(s) for a serving cell and either all of the configured BWP(s) are considered activated implicitly or alternatively, or, RRC signaling explicitly indicates which of the configured BWP are to be activated. The said activation can be specified or signaled to be performed immediately/subsequently upon reception and processing of RRC Signaling; or, could be contingent upon another event including but not limited to activation of the serving cell in question using a MAC CE for serving cell activation and deactivation. The said RRC signaling could be a reconfiguration message reconfiguring the Access Stratum Protocol layers, could be a specific Reconfiguration only to reconfigure the BWP(s) or it could be a Synchronized RRC Reconfiguration message for indicating handover to a target cell or for SCG Change, etc.

Figure 9:
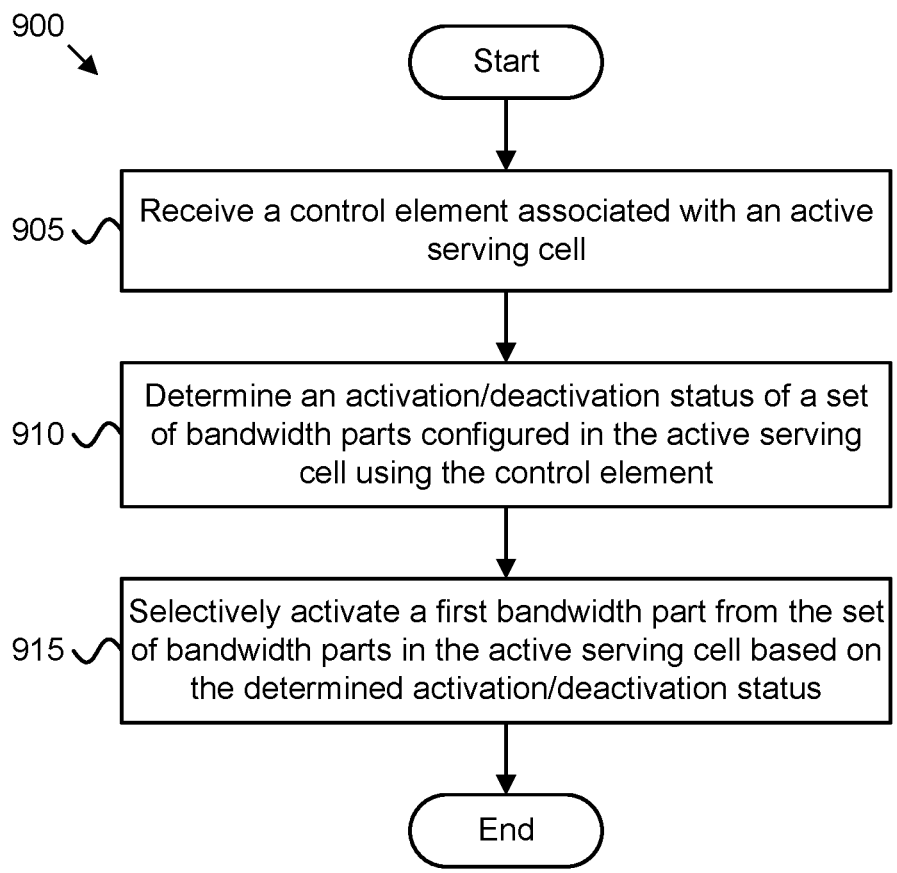
FIG. 9 is a flow chart diagram illustrating one method of activating a bandwidth part.

FIG. 9 is a schematic flow chart diagram illustrating one embodiment of a method 900 for activating a bandwidth part, according to embodiments of the disclosure. In some embodiments, the method 900 is performed by a remote unit, such as the remote unit 105 and/or the user equipment apparatus 200. In certain embodiments, the method 900 may be performed by a processor executing program code, for example, a microcontroller, a microprocessor, a CPU, a GPU, an auxiliary processing unit, a FPGA, or the like.

The method 900 begins and receives 905 a control element from a base unit associated with an active serving cell. In some embodiments, the control element is a MAC CE. In other embodiments, the control element in DCI.

The method 900 includes determining 910 an activation/deactivation status of a set of BWPs configured in the active serving cell using the control element. In one embodiment, the control element includes a first parameter identifying a serving cell and a second parameter that indicates activation/deactivation statuses for the BWPs configured for the identified serving cell. In certain embodiments, the second parameter may be a bitmap.

In another embodiment, the control element includes a first parameter that indicates an activation/deactivation status of a set of configured serving cells and a second parameter indicating activation/deactivation statuses for the BWPs configured for the serving cells. Here, determining 910 the activation/deactivation status of the set of BWPs configured in the active serving cell may include identifying a portion of the second parameter corresponding to the active serving cell and identifying the activation/deactivation status of the first BWP indicated by the identified portion of the second parameter. In certain embodiments, the second parameter may include a bitmap for each configured serving cell.

In other embodiments, the control element may be DCI that includes a BWP indicator field. Here, the activation/deactivation status may be determined 910 using a combination of the BWP indicator field, a switching indicator included in DCI, and a resource allocation in DCI.

The method 900 includes selectively activating 915 a first BWP from the set of bandwidth parts in the active serving cell based on the determined activation/deactivation status. Where the activation/deactivation status indicates BWP switching, selectively activating 915 a first BWP includes activating the first BWP while also deactivating a second BWP. In some embodiments, selectively activating 915 a first bandwidth part includes maintaining multiple concurrently active BWPs. In certain embodiments, selectively activating 915 a first BWP includes deactivating the first BWP according to the activation./deactivation status. The method 900 ends.

Disclosed herein is a first apparatus for activating a bandwidth part. In various embodiments, the first apparatus may be the remote unit 105 and/or the user equipment apparatus 200. The first apparatus includes a transceiver that receives a control element from a base unit associated with an active serving cell. The first apparatus includes a processor that determines an 'activation/deactivation' status of a set of BWPs configured in the active serving cell using the control element. The processor selectively activates a first BWP from the set of BWPs in the active serving cell based on the determined activation/deactivation status.

In some embodiments, the active serving cell is configured with a plurality of BWPs and the processor deactivates a second BWP from the set of BWPs in the active serving cell based on a status indicated by the control element. In such embodiments, the control element may include a first parameter indicating a status for at least one serving cell and a second parameter indicating activation/deactivation statuses for a plurality of BWPs. Here, determining the activation/deactivation status of the set of BWPs includes: identifying a portion of the second parameter corresponding to an active serving cell; and identifying an activation/deactivation status of the first BWP indicated by the identified portion of the second parameter.

In certain embodiments, the first apparatus is configured with one or more serving cells, each configured serving cell being configured with one or more BWPs. In such embodiments, the second parameter includes a bitmap for each configured serving cell, each bitmap indicating an activation/deactivation status of the one or more BWPs of the configured serving cell. In one embodiment, the processor determines whether each configured serving cell is activated based on the first parameter and ignores a bitmap in the second parameter corresponding to a deactivated serving cell.

In certain embodiments, the control element indicates multiple active serving cells, each active serving cell being configured with one or more BWPs. In such embodiments, the second parameter may include a bitmap for each active serving cell, each bitmap indicating an activation/deactivation status of the one or more BWPs of the configured serving cell.

In certain embodiments, the active serving cell is configured with a number of BWPs. Here, a size of the portion of the second parameter corresponding to the active serving cell is based on the number of BWPs. In certain embodiments, the first method includes receiving DCI including a BWP indicator field. Here, a size of the portion of the second parameter corresponding to the active serving cell is based on a size of the BWP indicator field.

In certain embodiments, the processor activates a first serving cell based on the status indicated by the first parameter. In such embodiments, activating the first serving cell includes activating at least one BWP indicated by a portion of the second parameter corresponding to the first serving cell.

In certain embodiments, the portion of the second parameter corresponding to the active serving cell includes a first bitmap indicating the activation/deactivation status of a set of uplink BWPs and a second bitmap indicating the activation/deactivation status of a set of downlink BWPs.

In some embodiments, the control element includes a first parameter identifying the serving cell and a second parameter indicating activation/deactivation statuses for a set of BWPs of the identified serving cell. In such embodiments, determining the activation/deactivation status of the set of BWPs in the active serving cell using the control element includes identifying an activation/deactivation status of each BWP of the active serving cell using the second parameter. In certain embodiments, the second parameter includes a bitmap indicating the activation/deactivation status of each BWP of the identified serving cell. Here, each BWP may be associated with a BWP index, with each field of the bitmap corresponding to one BWP index.

In certain embodiments, a size of the second parameter is based on a number of BWPs configured for the indicated serving cell. In certain embodiments, the set of BWPs includes the BWPs configured for the indicated serving cell. In certain embodiments, the transceiver receives DCI including a BWP indicator field. In such embodiments, a size of the second parameter is based on a size of the BWP indicator field.

In some embodiments, the processor determines an activation/deactivation status for the serving cell that is identified by the first parameter. Here, selectively activating the first BWP includes activating the first BWP in response to both the activation/deactivation status for the serving cell being an active status and the activation/deactivation status for the first BWP being an active status. In certain embodiments, the processor ignores an indicated activation/deactivation status for a serving cell that is not active. In certain embodiments, the processor determines whether the serving cell that is identified by the first parameter is active and, if not active, then the processor activates the serving cell indicated by the first parameter.

In certain embodiments, the second parameter includes: a first bitmap indicating the activation/deactivation status of a set of uplink BWPs, and a second bitmap indicating the activation/deactivation status of a set of downlink BWPs.

In some embodiments, the control element is received via the active serving cell. Here, the control element includes a bitmap indicating activation/deactivation statuses for the set of configured BWPs of the active serving cell. In such embodiments, determining the activation/deactivation status of the set of BWPs in the active serving cell using the control element may include identifying an activation/deactivation status of each BWP of the active serving cell using the bitmap.

In some embodiments, the control element includes a BWP indicator field in DCI, the BWP indicator field indicating the first BWP. In such embodiments, the DCI is received on a current active BWP.

In further embodiments, the processor determines whether the current active BWP is to be deactivated using the BWP indicator field and a switching indicator in the DCI. In such embodiments, selectively activating the first BWP may include the processor a) switching from the current active BWP to the first BWP in response to determining that the current active BWP is to be deactivated, and b) activating the first BWP while maintaining active the current active bandwidth in response to determining that current BWP is not to be deactivated. In certain embodiments, the processor determines whether the current active BWP is to be deactivated based on a flag in the DCI which indicates whether to switch to or to activate the bandwidth indicted by the bandwidth indicator field.

In some embodiments, the DCI includes a resource allocation. In such embodiments, the processor may determine whether the resource allocation is valid. Here, determining an activation/deactivation status of the first BWP may include determining the first BWP is to be deactivated in response to the resource allocation being invalid. In certain embodiments, the DCI includes a field indicating whether transmission is to occur on the first BWP prior to deactivation of the first BWP. In one embodiment, the resource allocation in the DCI applies to the first BWP. In another embodiment, the DCI is received on a current BWP and the resource allocation in the DCI applies to the current active BWP.

In certain embodiments, the DCI includes a field indicating whether transmission is to occur on the current active BWP prior to selectively activating the first BWP. In certain embodiments, the DCI includes a resource allocation. In such embodiments, the processor may determine whether the resource allocation is an uplink resource or a downlink resource. In one embodiment, the BWP indicator field indicates an uplink BWP when the resource allocation is an uplink resource, and the BWP indicator field indicates a downlink BWP when the resource allocation is a downlink resource.

In further embodiments, the processor determines whether a format of the resource allocation is a first format allocating an uplink resource or a second format allocating a downlink resource. In one embodiment, the BWP indicator field indicates an uplink BWP in response to the resource allocation having the first format and indicates a downlink BWP in response to the resource allocation having the second format.

In certain embodiments, the DCI contains timing information. In such embodiments, selectively activating the first BWP may include performing, at a time indicated by the timing information, one of: activating the first BWP, switching to the first BWP, and deactivating the first BWP.

In certain embodiments, the DCI further includes a flag indicating whether the BWP indicator field applies to both uplink and downlink. In such embodiments, selectively activating the first BWP includes activating a downlink BWP and a linked uplink BWP in response to the flag indicating that the BWP indicator field applies to both uplink and downlink.

In certain embodiments, the DCI is received on a current BWP. In such embodiments, the processor further receives an RRC message indicating whether the apparatus is to switch BWPs in response to receiving the DCI containing the BWP indicator field. Here, selectively activating the first BWP includes a) activating the first BWP and deactivating the current BWP if the RRC message indicates the apparatus is to switch BWPs, and b) activating the first BWP while maintaining active the current bandwidth if the RRC message does not indicate the apparatus is to switch BWPs.

In various embodiments, the BWP indicator field includes a bitmap indicating an activation/deactivation status of each BWP configured for the serving cell.

In some embodiments, the processor further: detects the expiry of an inactivity timer associated with the active serving cell; activating a default BWP in the active serving cell; and deactivates all other BWPs in the set of BWPs configured for the active serving cell. In such embodiments, the inactivity timer is started in response to receiving control signaling indicating a resource allocation.

In some embodiments, the processor further: detects the expiry of an inactivity timer associated with the active serving cell; and deactivates each BWPs in the set of BWPs configured for the active serving cell.

In some embodiments, the processor further: detects the expiry of a first inactivity timer associated with the first BWP; and deactivating the first BWP in response to expiry of the first inactivity timer. Here, each BWP in the set of BWPs configured for the active serving cell may be associated with a separate inactivity timer. In such embodiments, the processor may also determine whether at least one BWP in the set of BWPs is active; and switching to a default BWP in response to no other BWP in the set of BWPs being active.

In one embodiment, the processor switches to a default BWP in response to expiry of the first inactivity timer. Here, switching to a default BWP in response to expiry of the first inactivity timer may include: deactivating each BWP in the set of BWPs configured for the active serving cell; and activating the default BWP. In certain embodiments, the inactivity timer is started in response to receiving DCI allocating resources on the first BWP from the set of BWPs configured for the active serving cell.

Disclosed herein is a first method for activating a bandwidth part. In various embodiments, the first method is performed by a UE, such as the remote unit 105 and/or the user equipment apparatus 200. The first method includes the UE receiving a control element from a base unit associated with an active serving cell. The first method includes the UE determining an 'activation/deactivation' status of a set of BWPs configured in the active serving cell using the control element. The first method includes the UE selectively activating a first BWP from the set of BWPs in the active serving cell based on the determined activation/deactivation status.

In some embodiments, the first method includes deactivating a second BWP from the set of BWPs in the active serving cell based on a status indicated by the control element, wherein the active serving cell is configured with a plurality of BWPs. In such embodiments, the control element may include a first parameter indicating a status for at least one serving cell and a second parameter indicating activation/deactivation statuses for a plurality of BWPs. Here, determining an activation/deactivation status of the set of BWPs includes: identifying a portion of the second parameter corresponding to an active serving cell; and identifying an activation/deactivation status of the first BWP indicated by the identified portion of the second parameter.

In certain embodiments, the UE is configured with one or more serving cells, each configured serving cell being configured with one or more BWPs. In such embodiments, the second parameter includes a bitmap for each configured serving cell, each bitmap indicating an activation/deactivation status of the one or more BWPs of the configured serving cell. In one embodiment, the first method includes determining whether each configured serving cell is activated based on the first parameter and ignoring a bitmap in the second parameter corresponding to a deactivated serving cell.

In certain embodiments, the control element indicates multiple active serving cells, each active serving cell being configured with one or more BWPs. In such embodiments, the second parameter may include a bitmap for each active serving cell, each bitmap indicating an activation/deactivation status of the one or more BWPs of the configured serving cell.

In certain embodiments, the active serving cell is configured with a number of BWPs. Here, a size of the portion of the second parameter corresponding to the active serving cell is based on the number of BWPs. In certain embodiments, the first method includes receiving DCI including a BWP indicator field, wherein a size of the portion of the second parameter corresponding to the active serving cell is based on a size of the BWP indicator field.

In certain embodiments, the first method includes activating a first serving cell based on the status indicated by the first parameter, wherein activating the first serving cell includes activating at least one BWP indicated by a portion of the second parameter corresponding to the first serving cell.

In certain embodiments, the portion of the second parameter corresponding to the active serving cell includes a first bitmap indicating the activation/deactivation status of a set of uplink BWPs and a second bitmap indicating the activation/deactivation status of a set of downlink BWPs.

In some embodiments, the control element includes a first parameter identifying the serving cell and a second parameter indicating activation/deactivation statuses for the set of BWPs of the identified serving cell. In such embodiments, determining the activation/deactivation status of the set of BWPs in the active serving cell using the control element includes identifying an activation/deactivation status of each BWP of the active serving cell using the second parameter. In such embodiments, the second parameter includes a bitmap indicating the activation/deactivation status of each BWP of the identified serving cell. Here, each BWP may be associated with a BWP index, with each field of the bitmap corresponding to one BWP index.

In certain embodiments, a size of the second parameter is based on a number of BWPs configured for the indicated serving cell. In certain embodiments, the set of BWPs includes the BWPs configured for the indicated serving cell. In certain embodiments, the first method includes receiving DCI including a BWP indicator field, wherein a size of the second parameter is based on a size of the BWP indicator field.

In some embodiments, the first method includes determining an activation/deactivation status for the serving cell indicated by the first parameter. Here, selectively activating the first BWP includes activating the first BWP in response to both the activation/deactivation status for the serving cell being an active status and the activation/deactivation status for the first BWP being an active status. In certain embodiments, the UE ignores an indicated activation/deactivation status for a serving cell that is not active. In certain embodiments, the first method includes determining whether the serving cell indicated by the first parameter is active and activating the serving cell indicated by the first parameter in response to the serving cell not being active.

In certain embodiments, the second parameter includes: a first bitmap indicating the activation/deactivation status of a set of uplink BWPs, and a second bitmap indicating the activation/deactivation status of a set of downlink BWPs.

In some embodiments of the first method, the control element is received via the active serving cell. Here, the control element includes a bitmap indicating activation/deactivation statuses for the set of configured BWPs of the active serving cell. In such embodiments, determining the activation/deactivation status of the set of BWPs in the active serving cell using the control element may include identifying an activation/deactivation status of each BWP of the active serving cell using the bitmap.

In some embodiments of the first method, the control element includes a BWP indicator field in DCI, the BWP indicator field indicating the first BWP. In such embodiments, the DCI is received on a current active BWP.

In further embodiments, the first method includes determining whether the current active BWP is to be deactivated using the BWP indicator field and a switching indicator in the DCI. In such embodiments, selectively activating the first BWP may include a) switching from the current active BWP to the first BWP in response to determining that the current active BWP is to be deactivated, and b) activating the first BWP while maintaining active the current active bandwidth in response to determining that current BWP is not to be deactivated. In certain embodiments determining whether the current active BWP is to be deactivated is based on a flag in the DCI which indicates whether to switch to or to activate the bandwidth indicted by the bandwidth indicator field.

In some embodiments, the DCI includes a resource allocation. In such embodiments, the first method may include determining whether the resource allocation is valid. Here, determining an activation/deactivation status of the first BWP may include determining the first BWP is to be deactivated in response to the resource allocation being invalid. In certain embodiments, the DCI includes a field indicating whether transmission is to occur on the first BWP prior to deactivation of the first BWP. In one embodiment, the resource allocation in the DCI applies to the first BWP. In another embodiment, the DCI is received on a current BWP and the resource allocation in the DCI applies to the current active BWP.

In certain embodiments, the DCI includes a field indicating whether transmission is to occur on the current active BWP prior to selectively activating the first BWP. In certain embodiments, the DCI includes a resource allocation. In such embodiments, the first method may include determining whether the resource allocation is an uplink resource or a downlink resource. In one embodiment, the BWP indicator field indicates an uplink BWP when the resource allocation is an uplink resource, and the BWP indicator field indicates a downlink BWP when the resource allocation is a downlink resource.

In further embodiments, the first method includes determining whether a format of the resource allocation is a first format allocating an uplink resource or a second format allocating a downlink resource. In one embodiment, the BWP indicator field indicates an uplink BWP in response to the resource allocation having the first format and indicates a downlink BWP in response to the resource allocation having the second format.

In certain embodiments, the DCI contains timing information. In such embodiments, selectively activating the first BWP may include performing, at a time indicated by the timing information, one of: activating the first BWP, switching to the first BWP, and deactivating the first BWP.

In certain embodiments, the DCI further includes a flag indicating whether the BWP indicator field applies to both uplink and downlink. In such embodiments, selectively activating the first BWP includes activating a downlink BWP and a linked uplink BWP in response to the flag indicating that the BWP indicator field applies to both uplink and downlink.

In certain embodiments, the DCI is received on a current BWP. In such embodiments, the first method may further include receiving an RRC message indicating whether the UE is to switch BWPs in response to receiving the DCI containing the BWP indicator field. Here, selectively activating the first BWP includes a) activating the first BWP and deactivating the current BWP if the RRC message indicates the UE is to switch BWPs, and b) activating the first BWP while maintaining active the current bandwidth if the RRC message does not indicate the UE is to switch BWPs.

In various embodiments, the BWP indicator field includes a bitmap indicating an activation/deactivation status of each BWP configured for the serving cell.

In some embodiments, the first method includes: detecting the expiry of an inactivity timer associated with the active serving cell; activating a default BWP in the active serving cell; and deactivating all other BWPs in the set of BWPs configured for the active serving cell. In such embodiments, the inactivity timer is started in response to receiving control signaling indicating a resource allocation.

In some embodiments, the first method includes: detecting the expiry of an inactivity timer associated with the active serving cell; and deactivating each BWPs in the set of BWPs configured for the active serving cell.

In some embodiments, the first method includes: detecting the expiry of a first inactivity timer associated with the first BWP; and deactivating the first BWP in response to expiry of the first inactivity timer. Here, each BWP in the set of BWPs configured for the active serving cell may be associated with a separate inactivity timer. In such embodiments, the first method may also include determining whether at least one BWP in the set of BWPs is active; and switching to a default BWP in response to no other BWP in the set of BWPs being active.

In one embodiment, the first method further includes switching to a default BWP in response to expiry of the first inactivity timer. Here, switching to a default BWP in response to expiry of the first inactivity timer may include: deactivating each BWP in the set of BWPs configured for the active serving cell; and activating the default BWP. In certain embodiments, the inactivity timer is started in response to receiving DCI allocating resources on the first BWP from the set of BWPs configured for the active serving cell.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   receiving a control element from a base unit associated with an active serving cell,
      wherein the control element comprises a first parameter indicating at least one serving cell and a second parameter comprising a bitmap for each indicated serving cell, each bitmap of the second parameter indicating activation/deactivation statuses for a plurality of bandwidth parts for each indicated serving cell;
   ignoring a certain bitmap in the second parameter corresponding to a deactivated serving cell, each bitmap of the second parameter indicating an activation/deactivation status for each of the plurality of bandwidth parts of the corresponding indicated serving cell;
   determining an activation/deactivation status of a set of bandwidth parts configured in the active serving cell using the control element,
      wherein determining the activation/deactivation status of the set of bandwidth parts comprises identifying a bitmap corresponding to the active serving cell and identifying an activation/deactivation status of a first bandwidth part indicated by the identified bitmap; and
   selectively activating, by the UE, the first bandwidth part from the set of bandwidth parts in the active serving cell based on the determined activation/deactivation status.

2. An apparatus comprising:
   a transceiver that receives a control element from a base unit associated with an active serving cell,
      wherein the control element comprises a first parameter indicating at least one serving cell and a second parameter comprising a bitmap for each indicated serving cell, each bitmap of the second parameter indicating activation/deactivation statuses for a plurality of bandwidth parts for each indicated serving cell; and
   a processor that:
      ignores a certain bitmap in the second parameter corresponding to a deactivated serving cell, each bitmap of the second parameter indicating an activation/deactivation status for each of the plurality of bandwidth parts of the corresponding indicated serving cell;
      determines an activation/deactivation status of a set of bandwidth parts configured for the active serving cell using the control element,
         wherein determining the activation/deactivation status of the set of bandwidth parts comprises identifying a bitmap corresponding to the active serving cell and identifying an activation/deactivation status of a first bandwidth part indicated by the identified bitmap; and
      selectively activates the first bandwidth part from the set of bandwidth parts in the active serving cell based on the determined activation/deactivation status.

3. The apparatus of claim 2, wherein the processor further deactivates a second bandwidth part from the set of bandwidth parts in the active serving cell based on a status indicated by the control element, wherein the active serving cell is configured with a plurality of bandwidth parts.

4. The apparatus of claim 2,
   wherein the first parameter indicates an activation/deactivation status for the at least one serving cell.

5. The apparatus of claim 4,
   wherein the UE is configured with one or more serving cells, each configured serving cell being configured with a plurality of bandwidth parts, and
   wherein the second parameter comprises a bitmap for each configured serving cell, each bitmap indicating an activation/deactivation status of the plurality of bandwidth parts of the configured serving cell.

6. The apparatus of claim 4,
   wherein the control element indicates multiple active serving cells, each active serving cell being configured with a plurality of bandwidth parts, and
   wherein the second parameter comprises a bitmap for each active serving cell, each bitmap indicating an activation/deactivation status of the plurality of bandwidth parts of the active serving cell.

7. The apparatus of claim 4, wherein the processor further activates a first serving cell based on the status indicated by the first parameter, wherein activating the first serving cell comprises activating at least one bandwidth part indicated by a portion of the second parameter corresponding to the first serving cell.

8. The apparatus of claim 4, wherein the portion of the second parameter corresponding to the active serving cell comprises a first bitmap indicating the activation/deactivation status of a set of uplink bandwidth parts and a second bitmap indicating the activation/deactivation status of a set of downlink bandwidth parts.

9. The apparatus of claim 2,
   wherein the first parameter identifies the active serving cell and the second parameter indicates activation/deactivation statuses for the set of bandwidth parts of the identified serving cell.

10. The apparatus of claim 9,
    wherein each bandwidth part is associated with a bandwidth part index, and
    wherein each field of the bitmap corresponds to one bandwidth part index.

11. The apparatus of claim 2,
wherein the control element comprises a bandwidth part indicator field in downlink control information, the bandwidth part indicator field indicating the first bandwidth part, and
wherein the downlink control information is received on a current active bandwidth part.

12. The apparatus of claim 11, wherein the processor further determines whether the current active bandwidth part is to be deactivated using the bandwidth part indicator field and a switching indicator in the downlink control information, wherein selectively activating the first bandwidth part comprises:
switching from the current active bandwidth part to the first bandwidth part in response to determining that the current active bandwidth part is to be deactivated, and
activating the first bandwidth part while maintaining active the current active bandwidth in response to determining that current bandwidth part is not to be deactivated.

13. The apparatus of claim 11, wherein the downlink control information comprises a resource allocation, the method further comprising determining whether the resource allocation is valid, wherein determining the activation/deactivation status of the set bandwidth parts comprises determining the first bandwidth part is to be deactivated in response to the resource allocation being invalid.

14. The apparatus of claim 13, wherein the downlink control information comprises a field indicating whether transmission is to occur on the first bandwidth part prior to deactivation of the first bandwidth part.

15. The apparatus of claim 11, wherein the downlink control information contains timing information, wherein selectively activating the first bandwidth part comprises performing, at a time indicated by the timing information, one of: activating the first bandwidth part, switching to the first bandwidth part, and deactivating the first bandwidth part.

16. The apparatus of claim 11, wherein the downlink control information further comprises a flag indicating whether the bandwidth part indicator field applies to both uplink and downlink, wherein selectively activating the first bandwidth part comprises activating a downlink bandwidth part and a linked uplink bandwidth part in response to the flag indicating that the bandwidth part indicator field applies to both uplink and downlink.

17. The apparatus of claim 2, wherein the processor further:
detects the expiry of an inactivity timer associated with the active serving cell;
activates a default bandwidth part in the active serving cell; and
deactivates all other bandwidth parts in the set of bandwidth parts configured for the active serving cell.

18. The apparatus of claim 2, wherein the processor further:
detects the expiry of an inactivity timer associated with the active serving cell; and
deactivates each bandwidth parts in the set of bandwidth parts configured for the active serving cell.

19. The apparatus of claim 2, wherein the processor further:
detects the expiry of a first inactivity timer associated with the first bandwidth part, wherein each bandwidth part in the set of bandwidth parts configured for the active serving cell is associated with a separate inactivity timer; and
deactivates the first bandwidth part in response to expiry of the first inactivity timer.

20. The apparatus of claim 19, wherein the processor further:
determines whether at least one bandwidth part in the set of bandwidth parts is active; and
switches to a default bandwidth part in response to no other bandwidth part in the set of bandwidth parts being active.

21. The apparatus of claim 20, wherein switching to a default bandwidth part in response to expiry of the first inactivity timer comprises:
deactivating each bandwidth part in the set of bandwidth parts configured for the active serving cell; and
activating the default bandwidth part.

* * * * *